(12) United States Patent
Kizu et al.

(10) Patent No.: US 7,375,783 B2
(45) Date of Patent: May 20, 2008

(54) LIQUID CRYSTAL DISPLAY

(75) Inventors: Yuko Kizu, Yokohama (JP); Rei Hasegawa, Yokohama (JP); Tsuyoshi Hioki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 337 days.

(21) Appl. No.: 11/313,925

(22) Filed: Dec. 22, 2005

(65) Prior Publication Data

US 2007/0019141 A1    Jan. 25, 2007

(30) Foreign Application Priority Data

Dec. 28, 2004    (JP)    ............... 2004-380590

(51) Int. Cl.
G02F 1/1337    (2006.01)
(52) U.S. Cl. .................. 349/123; 349/113; 349/126
(58) Field of Classification Search ............... 349/104, 349/105, 106, 107, 117, 123, 126, 128, 132, 349/193, 113
See application file for complete search history.

(56) References Cited

U.S. PATENT DOCUMENTS

| | | | | |
|---|---|---|---|---|
| 6,151,089 | A * | 11/2000 | Yang et al. ................. | 349/113 |
| 2001/0022636 | A1 * | 9/2001 | Yang et al. .................. | 349/65 |
| 2004/0070710 | A1 * | 4/2004 | Yoshii ........................ | 349/113 |
| 2004/0090574 | A1 * | 5/2004 | Tanada et al. .............. | 349/113 |
| 2007/0019141 | A1 * | 1/2007 | Kizu et al. .................. | 349/123 |

FOREIGN PATENT DOCUMENTS

| | | |
|---|---|---|
| JP | 04-055817 | 2/1992 |
| JP | 08-114804 | 5/1996 |
| JP | 09-222616 | 8/1997 |
| JP | 2000-155318 | 6/2000 |
| JP | 2001-183666 | 7/2001 |
| JP | 2001-305547 | 10/2001 |
| JP | 2002-090746 | 3/2002 |
| JP | 2003-75873 | 3/2003 |
| JP | 3459916 | 8/2003 |
| JP | 2004-279653 | 10/2004 |

* cited by examiner

*Primary Examiner*—Brian M. Healy
(74) *Attorney, Agent, or Firm*—Oblon, Spivak, McClelland, Maier & Neustadt, P.C.

(57) ABSTRACT

A liquid crystal display includes a back substrate, a front substrate, and an optical filter layer interposed therebetween. The optical filter layer contains a liquid crystal material which forms a bend configuration when a voltage is applied between electrodes of the back and front substrates. The electrodes of the back and front substrates are covered with alignment layers which include corrugated surfaces at positions of the electrodes. Each corrugated surface includes upslopes and downslopes steeper than the upslopes or vertical surfaces which are alternately joined.

20 Claims, 9 Drawing Sheets

LIQUID CRYSTAL DISPLAY

CROSS-REFERENCE TO RELATED APPLICATIONS

This application is based upon and claims the benefit of priority from prior Japanese Patent Application No. 2004-380590, filed Dec. 28, 2004, the entire contents of which are incorporated herein by reference.

BACKGROUND OF THE INVENTION

1. Field of the Invention

The present invention relates to a liquid crystal display which employs a display mode utilizing birefringence and, more particularly, to a liquid crystal display employing a display mode in which a liquid crystal material forms bend configuration.

2. Description of the Related Art

In a liquid crystal display using an optically compensated birefringence (OCB) mode, a liquid crystal material is caused to form bend configuration, and the tilt angles of liquid crystal molecules are changed near each alignment layer, thereby changing the optical retardation of an optical filter layer. Because of utilizing bend configuration, the OCB-mode is one of the display mode capable of realizing a high response speed and a wide viewing angle, and has attracted attention in recent years.

As described above, bend configuration is essential in the OCB-mode. However, bend configuration is difficult to stabilize as will be explained below.

That is, a liquid crystal material of OCB-mode liquid crystal display forms splay configuration in an initial state in which the power supply is off. Therefore, a process of changing splay configuration to bend configuration is necessary every time energizing the display. Due to uncontrollable factors regarding to the shape of the substrate surface or the electric field distribution, an unchanged region sometimes remains in the optical filter layer. In addition, splay configuration is intrinsically more stable than bend configuration under usual surface alignment conditions. Accordingly, if a voltage is not continuously applied, bend configuration may change to splay configuration.

To solve this problem, Japanese Patent No. 3459916 describes a structure in which the opposed surfaces of an active matrix substrate and counter substrate are inclined to each other. Japanese Patent No. 3459916 also describes a structure in which grooves having a V-shaped section are formed on the opposed surfaces of the active matrix substrate and counter substrate, such that the cell gap at a position corresponding to the center of a pixel electrode is wider than the cell gap at positions corresponding to the two ends of the pixel electrode.

Bend alignment can be stabilized by the use of these structures. However, the present inventors have found that a liquid crystal display which stabilizes bend configuration by using the above structures readily causes stripe-like modulation in the display brightness.

BRIEF SUMMARY OF THE INVENTION

According to a first aspect of the present invention, there is provided a liquid crystal display comprising a back substrate which comprises a first substrate, a first electrode disposed on a main surface of the first substrate, and a first alignment layer covering the first electrode and including a first corrugated surface at a position of the first electrode, wherein the first corrugated surface includes first upslopes and first downslopes steeper than the first upslopes or first vertical surfaces which are alternately joined in an in-plane direction parallel to the main surface of the first substrate, and wherein a period of the first upslope in the in-plane direction is 1 μm or less, a front substrate which comprises a second substrate facing the first alignment layer, a second electrode disposed on a main surface of the second substrate facing the first alignment layer, and a second alignment layer covering the second electrode and including a second corrugated surface at a position of the second electrode, wherein the second corrugated surface includes second upslopes and second downslopes steeper than the second upslopes or second vertical surfaces which are alternately joined in the in-plane direction, and wherein a period of the second upslope in the in-plane direction is 1 μm or less, and an optical filter layer interposed between the back and front substrates and containing a liquid crystal material which forms a bend configuration when a voltage is applied between the first and second electrodes.

According to a second aspect of the present invention, there if provided a liquid crystal display comprising a back substrate which comprises a first substrate, a first electrode disposed on a main surface of the first substrate, and a first alignment layer covering the first electrode and including a first corrugated surface at a position of the first electrode, wherein the first corrugated surface includes first upslopes and first downslopes steeper than the first upslopes or first vertical surfaces which are alternately joined in an in-plane direction parallel to the main surface of the first substrate, a front substrate which comprises a second substrate facing the first alignment layer, a second electrode disposed on a main surface of the second substrate facing the first alignment layer, and a second alignment layer covering the second electrode and including a second corrugated surface at a position of the second electrode, wherein the second corrugated surface includes second upslopes and second downslopes steeper than the second upslopes or second vertical surfaces which are alternately joined in the in-plane direction, and an optical filter layer interposed between the back and front substrates and containing a liquid crystal material which forms a bend configuration when a voltage is applied between the first and second electrodes.

According to a third aspect of the present invention, there is provided a liquid crystal display comprising a back substrate which comprises a first substrate, a first electrode disposed on a main surface of the first substrate, and a first alignment layer covering the first electrode and including a first corrugated surface at a position of the first electrode, wherein the first corrugated surface includes first upslopes and first downslopes steeper than the first upslopes or first vertical surfaces which are alternately joined, a front substrate which comprises a second substrate facing the first alignment layer, a second electrode disposed on a main surface of the second substrate facing the first alignment layer, and a second alignment layer covering the second electrode and including a second corrugated surface at a position of the second electrode, wherein the second corrugated surface includes second upslopes and second downslopes steeper than the second upslopes or second vertical surfaces which are alternately joined, and an optical filter layer interposed between the back and front substrates and containing a liquid crystal material which forms a bend configuration when a voltage is applied between the first and second electrodes.

DETAILED DESCRIPTION OF THE INVENTION

Figure 1:
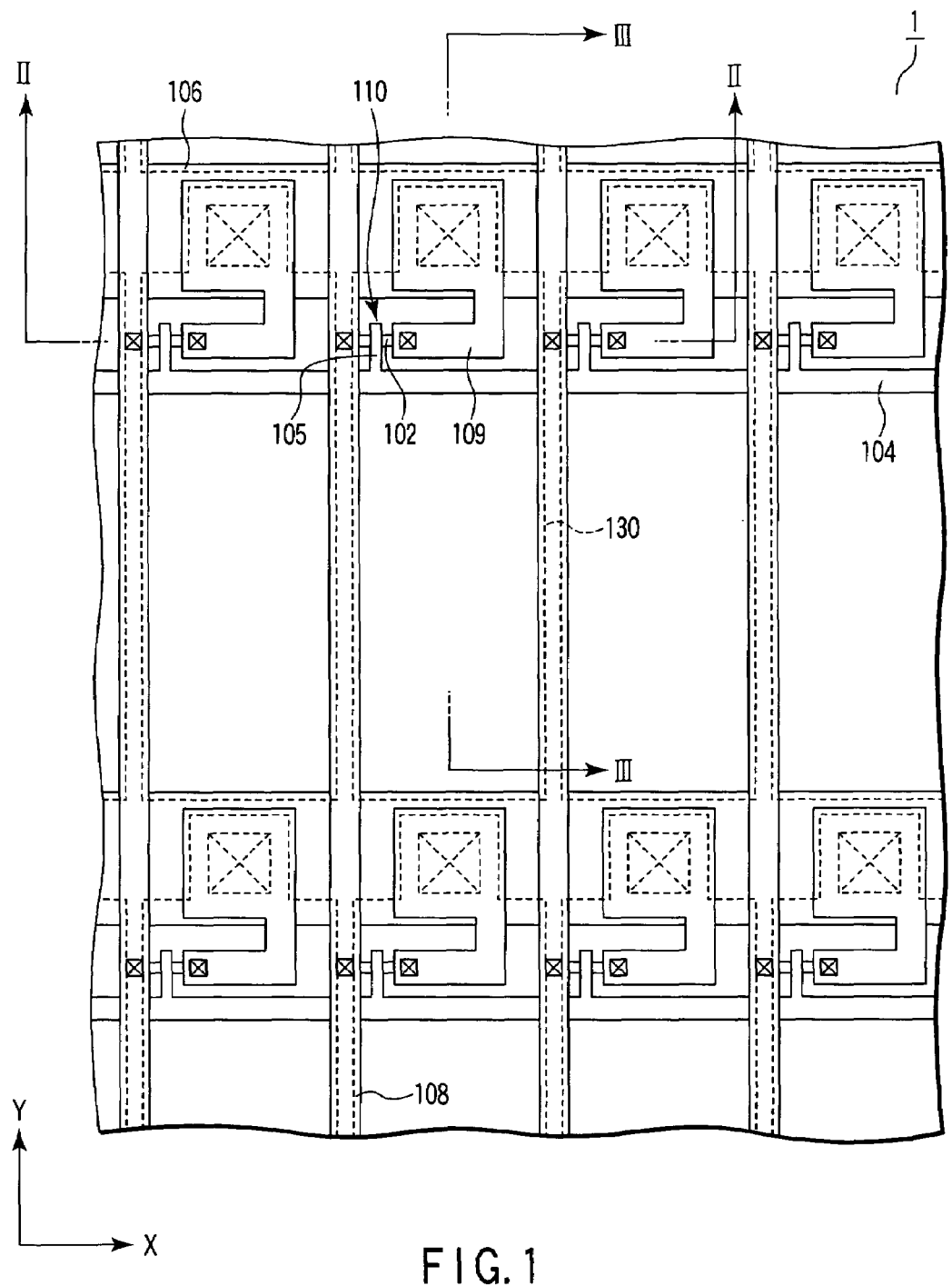
FIG. 1 is a plan view schematically showing a liquid crystal display according to the first embodiment of the present invention.

Embodiments of the present invention will be described in detail below with reference to the accompanying drawing. Note that the same reference numerals denote components which achieve the same or similar functions in the drawing, and repetitive explanation thereof will be omitted.

Figure 2:
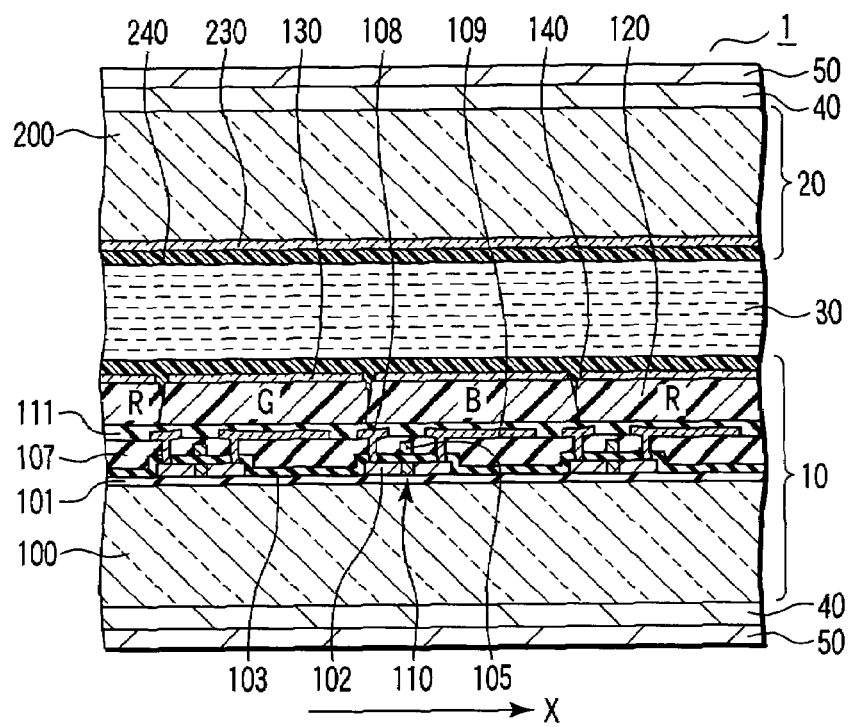
FIG. 2 is a sectional view taken along a line II-II of the liquid crystal display shown in FIG. 1.
Figure 3:
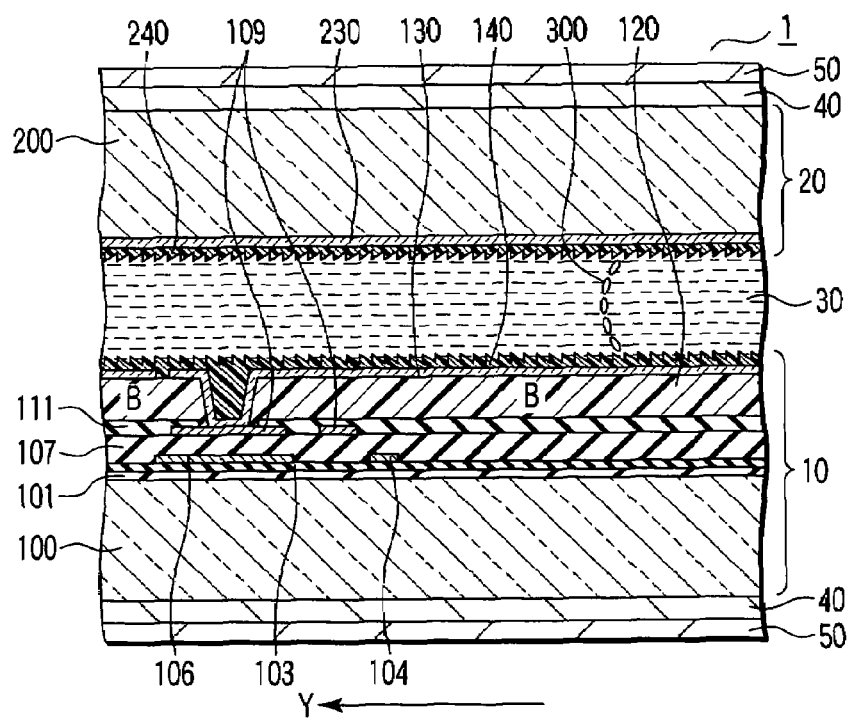
FIG. 3 is a sectional view taken along a line III-III of the liquid crystal display shown in FIG. 1.

FIG. 1 is a plan view schematically showing a liquid crystal display according to the first embodiment of the present invention. FIG. 2 is a sectional view taken along a line II-II of the liquid crystal display shown in FIG. 1. FIG. 3 is a sectional view taken along a line III-III of the liquid crystal display shown in FIG. 1. Note that a color filter (to be described later) is omitted from FIG. 1.

The liquid crystal display is an OCB-mode active matrix liquid crystal display, and includes a liquid crystal display panel 1, and a backlight (not shown) on which the liquid crystal display panel 1 is stacked.

As shown in FIGS. 2 and 3, the liquid crystal display panel 1 includes a back substrate 10 as an array substrate, and a front substrate 20 as a counter substrate. A frame-like adhesive layer (not shown) is interposed between the back substrate 10 and front substrate 20. A space surrounded by the back substrate 10, front substrate 20, and adhesive layer is filled with a liquid crystal material which forms an optical filter layer 30. An optical compensation film 40 and polarizer 50 are sequentially arranged on each of the outer surfaces of the back substrate 10 and front substrate 20.

The back substrate 10 includes a transparent substrate 100 such as a glass substrate.

On the transparent substrate 100, an undercoat layer 101 such as an $SiN_x$ layer and/or an $SiO_2$ layer is formed.

On the undercoat layer 101, a semiconductor layer 102 such as a polysilicon layer having a channel, source, and drain is formed.

The semiconductor layer 102 and undercoat layer 101 are covered with a gate insulator 103. The gate insulator 103 can be formed by using, e.g., tetraethoxy orthosilane (TEOS).

On the gate insulator 103, scan signal lines 104 shown in FIGS. 1 and 3, gate electrodes 105 shown in FIGS. 1 and 2, and reference lines 106 shown in FIGS. 1 and 3 are formed.

The scan signal lines 104 run in a first direction, and are arranged in a second direction crossing the first direction. Referring to FIG. 1, the scan signal lines 104 run in an X-direction which is the lateral or row direction, and are arranged in a Y-direction which is the longitudinal or column direction. A metal material can be used as the material of the scan signal lines 104. For example, MoW can be used as the material of the scan signal lines 104.

As shown in FIG. 1, the gate electrode 105 is formed as a part of the scan signal line 104. Also, as shown in FIG. 2, the gate electrode 105 faces a channel formed in the semiconductor layer 102 via the gate insulator 103. The gate electrode 105, gate insulator 103, and semiconductor layer 102 form a thin film transistor as a switching element 110 positioned near the intersection of the scan signal line 104 and a video signal line 108 (to be described later). Note that the switching element 110 is a thin film transistor in this embodiment, but it may also be another element such as a diode or a metal-insulator-metal (MIM) element.

The reference lines 106 run in the X-direction, and are arranged in the Y-direction crossing the X-direction. In this embodiment, one reference line 106 is formed for each scan signal line. The reference lines 106 can be formed in, e.g., the same step as the scan signal lines 104.

As shown in FIGS. 2 and 3, the gate insulator 103, scan signal lines 104, gate electrodes 105, and reference lines 106 are covered with an interlayer dielectric film 107. $SiO_2$ and/or $SiN_x$, for example, can be used as the interlayer dielectric film 107.

As shown in FIGS. 1 and 2, video signal lines 108 and source electrodes 109 are arranged on the interlayer dielectric film 107.

The video signal lines 108 run in the second direction and are arranged in the first direction. Referring to FIG. 1, the video signal lines 108 run in the Y-direction and are arranged in the X-direction. A metal material can be used as the material of the video signal lines 108. For example, a three-layered structure including a Mo layer, Al—Nd layer, and Mo layer can be used as the video signal lines 108.

In this embodiment, a thin film transistor is used as the switching element 110, and, as shown in FIG. 2, the video signal line 108 is connected to the drain of the thin film transistor 110 via a through hole formed in the interlayer dielectric film 107. That is, in this embodiment, the video signal line 108 also serves as a drain electrode.

As shown in FIGS. 1 and 2, one end of the source electrode 109 is connected to the source of the thin film transistor 110 via a through hole formed in the interlayer dielectric film 107. Also, as shown in FIGS. 1 and 3, the other end of the source electrode 109 faces the reference line 106 via the interlayer dielectric film 107. That is, in this embodiment, the source electrode 109, reference line 106, and interlayer dielectric film 107 form a capacitor (or condenser). For example, the same material as the video signal line 108 can be used as the source electrode 109.

The interlayer dielectric film 107, video signal lines 108, and source electrodes 109 are covered with an insulating underlayer. Although the insulating underlayer includes a passivation layer 111 and color filter 120 in this embodiment, the passivation layer 111 may be omitted.

As shown in FIGS. 2 and 3, the passivation layer 111 covers the interlayer dielectric film 107, video signal lines 108, and source electrodes 109. It is possible to use, e.g., $SiN_x$ layer as the passivation layer 111.

A color filter 120 includes a plurality of coloring layers different in absorption spectrum, e.g., a green coloring layer G, blue coloring layer B, and red coloring layer R. In this embodiment, the coloring layers G, B, and R have a band-like shape which runs in the Y-direction as shown in FIG. 3, and are arranged in the X-direction as shown in FIG. 2, thereby forming a stripe pattern. Also, in this embodiment as shown in FIG. 2, the coloring layers G, B, and R are formed such that their boundaries are positioned on the video signal lines 108. As the coloring layers G, B, and R, it is possible to use, e.g., a mixture of a transparent resin and a dye and/or a pigment. Note that the color filter 120 is formed on the back substrate 10 in this embodiment, but it may also be formed on the front substrate 20.

On the color filter 120, as shown in FIGS. 1 to 3, pixel electrodes 130 made of a transparent conductor such as indium tin oxide (ITO) are arranged correspondently with the thin film transistors 110. As shown in FIGS. 1 and 3, the pixel electrodes 130 are connected to the source electrodes 109 via through holes formed in the passivation layer 111 and color filter 120.

The pixel electrodes 130 and color filter 120 are covered with an alignment layer 140. It is possible to use, e.g., a resin such as polyimide as the material of the alignment layer 140.

A portion of the alignment layer 140, which is positioned on each pixel electrode 130 includes a corrugated surface obtained by alternately joining upslopes and downslopes steeper than the upslopes or vertical surfaces. In this embodiment, as shown in FIG. 3, substantially the whole of the alignment layer 140 includes a corrugated surface obtained by alternately joining upslopes and vertical surfaces in the Y-direction.

An alignment process such as rubbing is performed on the alignment layer 140. When rubbing is to be performed as the alignment process, a direction substantially the same as the arrangement direction of the upslopes, i.e., the Y-direction in this embodiment, is the rubbing direction.

As shown in FIGS. 2 and 3, the front substrate 20 includes a transparent substrate 200 such as a glass substrate. The substrate 200 faces the surface, on which the alignment layer 140 is formed, of the back substrate 10.

A common electrode 230 is formed on that surface of the substrate 200, which faces the back substrate 10. A transparent conductor such as ITO, for example, can be used as the common electrode 230.

The common electrode 230 is covered with an alignment layer 240. The alignment layer 240 is spaced apart from those portions of the alignment layer 140, which are positioned on the pixel electrodes 130, by a spacer (not shown). A resin such as polyimide, for example, can be used as the material of the alignment layer 240.

A portion of the alignment layer 240, which is positioned on the common electrode 230 includes a corrugated surface obtained by alternately joining upslopes and downslopes steeper than the upslopes or vertical surfaces in the same direction as the corrugated surface of the alignment layer 140. In this embodiment, as shown in FIG. 3, substantially the whole of the alignment layer 240 includes a corrugated surface obtained by alternately joining upslopes and vertical surfaces in the Y-direction.

An alignment process such as rubbing is performed on the alignment layer 240. When rubbing is to be performed as the alignment process, a direction substantially the same as the arrangement direction of the upslopes, i.e., the Y-direction in this embodiment, is the rubbing direction.

A frame-like adhesive layer (not shown) is interposed between the back substrate 10 and front substrate 20. In addition, granular spacers (not shown) are located between the back substrate 10 and front substrate 20 and inside the frame formed by the adhesive layer. Alternatively, columnar spacers are formed on at least one of the opposed surfaces of the back substrate 10 and front substrate 20. These spacers keep the thickness of the space surrounded by the back substrate 10, front substrate 20, and adhesive layer constant.

The optical filter layer 30 contains a liquid crystal material having positive dielectric anisotropy and positive refractive index anisotropy. This liquid crystal material forms bend configuration while a voltage is applied between the pixel electrodes 130 and common electrode 230. Bright display and dark display are switched by changing, between a first value which is typically larger than zero and a second value which is larger than the first value, the absolute value of a voltage to be applied between the pixel electrodes 130 and common electrode 230. Note that in this embodiment, the first value may be zero in some cases. In the following description, a state in which the absolute value of the applied voltage is the first value will be referred to as an off state, and a state in which the absolute value of the applied voltage is the second value will be referred to as an on state.

FIG. 3 shows liquid crystal molecules 300 forming bend configuration in the off state. The tilt angle of the liquid crystal molecules near the alignment layers 140 and 240 in the on state is larger than that in the off state.

The optical compensation films 40 are, e.g., biaxial films. Each optical compensation film 40 includes an optically anisotropic layer in which a uniaxial compound having negative refractive index anisotropy, e.g., a discotic liquid crystal compound, form hybrid configuration.

For example, in the optical compensation film 40 covering the substrate 100, the optic axis of the uniaxial compound positioned near the back substrate 10 is substantially parallel to the optic axis of the liquid crystal molecules 300 which are in the on state and positioned near the back substrate 10. The optic axis of the uniaxial compound positioned far from the back substrate 10 is substantially parallel to the optic axis of the liquid crystal molecules 300 which are in the on state and positioned in the middle between the back substrate 10 and front substrate 20. In this case, in the optical compensation film 40 covering the substrate 200, the optic axis of the uniaxial compound positioned near the front substrate 20 may be substantially parallel to the optic axis of the liquid crystal molecules 300 which are in the on state and positioned near the front substrate 20, and the optic axis of the uniaxial compound positioned far from the front substrate 20 may be substantially parallel to the optic axis of the liquid crystal molecules 300 which are in the on state and positioned in the middle between the back substrate 10 and front substrate 20. The sum of the optical retardations of the optical compensation films 40 may be substantially equal to the optical retardation in the on state of the optical filter layer 30.

The polarizers 50 may be arranged such that their transmission axes are substantially perpendicular to each other. In addition, each polarizer 50 may be placed such that its transmission axis makes an angle of about 45° with each of the X-direction and Y-direction.

The backlight (not shown) illuminates the back substrate 10 of the liquid crystal display panel 1.

Note that in this embodiment, the liquid crystal display 1 has a structure which makes it possible to display an image in normally white mode. Alternatively, the liquid crystal display 1 may have a structure which makes it possible to display an image in normally black mode. Note also that this embodiment employs an arrangement which compensates for the on state, but an arrangement which compensates for the off state may also be employed.

The present inventors made extensive studies on the reason why stripe-like modulation in the display brightness readily occurs to the OCB-mode liquid crystal display according to the prior art when bend configuration is stabilized, and have found the following facts.

As explained earlier, Japanese Patent No. 3459916 describes the structure in which those portions of the opposed surfaces of the two substrates corresponding to the pixels are inclined, and the structure in which the groove having a V-shaped section is formed for each pixel on the opposed surfaces of the substrates. In these structures, the sum of the inclination angle of the inclined surface of each opposed surface and the pretilt angle of liquid crystal molecules with respect to the inclined surface is equivalent to the effective pretilt angle of the liquid crystal molecules.

Letting $D_{max}$ be the maximum value of the cell gap and PP be the pixel pitch, the gradient of the inclined surface in the former structure, i.e., the ratio of the length of the inclined surface in a direction perpendicular to the substrate surface with respect to the length of the inclined surface in a direction parallel to the substrate surface, in a section perpendicular to the inclined surface and substrate surface, is the maximum when the structures are formed in one-to-one correspondence with pixels, and this maximum value is $D_{max}/(2PP)$ for each facing substrate. On the other hand, the gradient of the inclined surface in the latter structure is the maximum in the same case as above, and this maximum value is $D_{max}/PP$. In a general OCB-mode liquid crystal display, the cell gap and pixel pitch are typically about 10 μm and about 100 μm, respectively. When these typical values are used as the maximum value $D_{max}$ of the cell gap and the pixel pitch PP in, e.g., the latter structure, the maximum value of the gradient is 0.1 which is a little less than 6° as an inclination angle.

The pretilt angle of liquid crystal molecules which can be realized only by the normal alignment process such as rubbing is about 10°. To stabilize bend configuration with no voltage applied, a pretilt angle of at least about 45° is presumably necessary. Therefore, the above-mentioned inclination angle can achieve almost no effect of stabilizing bend configuration.

To sufficiently increase the inclination angle in order to obtain the effect of stabilizing bend configuration, the ratio $D_{max}/PP$ must be increased. Since the pixel pitch PP is determined by the dimensions of the screen or the number of pixels, it cannot be freely changed. Accordingly, the maximum value $D_{max}$ of the cell gap is increased. That is, it is necessary to increase the difference between the maximum value $D_{max}$ and a minimum value $D_{min}$ of the cell gap.

If the variation in cell gap increases, a brightness difference between a position where the cell gap is small and a position where the cell gap is large increases in the off state. Therefore, if the maximum value $D_{max}$ of the cell gap is increased in the structure described in Japanese Patent No. 3459916, a relatively large brightness change occurs in the off state along the arrangement direction of the inclined surfaces in the same period as the pixel pitch PP.

According to the modulation transfer function (MTF), which is the relationship between the spatial frequency of bright and dark stripes and the minimum contrast of bright and dark stripes perceivable by a human, the spatial frequency of bright and dark stripes perceivable by a human is 40 to 50 cycles per degree (cpd), where cpd is the stripe periodicity within a visual field of 1°. Assuming that the distance between an image and the eye is 10 cm when the image is observed as close as possible while the two eyes are in focus, the minimum value of the stripe period corresponding to the above-mentioned resolution is 30 to 40 μm. The period of the brightness change, i.e., the pixel pitch PP is 100 μm which is longer than 30 to 40 μm as the minimum value of the stripe period perceivable by a human. Therefore, if the maximum value $D_{max}$ of the cell gap is increased in the structure described in Japanese Patent No. 3459916, the overall brightness largely decreases, and stripe-like modulation in the display brightness is visually observed.

In this embodiment, as shown in FIG. 3, the surfaces of the alignment layers 140 and 240 are corrugated surfaces obtained by alternately joining upslopes and downslopes steeper than the upslopes or vertical surfaces. In addition, a period P of the periodic structure formed by the upslopes is made much shorter than the pixel pitch PP. Accordingly, this embodiment can prevent visual observation of stripe-like modulation in the display brightness even when the pretilt angle is well increased. That is, the stability of bend configuration can be increased without causing any stripe-like modulation in the display brightness. This will be explained in more detail below.

When the period P of the periodic structure formed by the upslopes is as short as, e.g., 1 μm or less, the period of bright and dark stripes is also 1 μm or less. This value is much smaller than the minimum value of the stripe period perceivable by a human. This makes bright and dark stripes difficult to be visually observed.

Also, when, for example, the period P is 1 μm or less and the inclination angle of the inclined surface is 45°, the difference between the maximum value $D_{max}$ and minimum value $D_{min}$ of the cell gap is 2 μm or less. If the maximum value $D_{max}$ of the cell gap is, e.g., 10 μm, the ratio of the difference $D_{max}-D_{min}$ to the maximum value $D_{max}$ is 0.2 or less. Note that if the pretilt angle the liquid crystal molecules make with the inclined surface increases, the inclination angle of the inclined surface can be further decreased, so the ratio $(D_{max}-D_{min})/D_{max}$ can be further decreased.

If the ratio $(D_{max}-D_{min})/D_{max}$ is low, the variation in brightness caused by the cell gap is small in the off state. That is, the contrast of bright and dark stripes produced by the variation in cell gap is low. If this contrast is low, bright and dark stripes are difficult to be visually observed.

As described above, when the period P is shortened, the spatial frequency of bright and dark stripes increases, and the contrast of the bright and dark stripes decreases. This makes it possible to prevent visually observable stripe-like modulation in the display brightness, and increase the stability of bend configuration.

The relationship between the cell gap and the optical retardation of the optical filter layer will be explained in more detail below.

Assume that light perpendicularly enters the optical filter layer 30, the refractive index of the optical filter layer 30 with respect to light having a plane of polarization parallel to the X-direction is $n_x$, and the refractive index of the optical filter layer 30 with respect to light having a plane of polarization parallel to the Y-direction is $n_y$. Assume also that the cell gap is D. In this case, an optical retardation R of the optical filter layer 30 can be represented by $R=(n_y-n_x) \times D$.

In the liquid crystal display shown in FIGS. 1 to 3, the cell gap D is not constant as described above. Also, in this liquid crystal display, the liquid crystal configuration at a position where the cell gap D is small slightly differs from that at a position where the cell gap D is large. Accordingly, the difference $n_x-n_y$ is also not constant.

That is, in this liquid crystal display, although the variations in cell gap D and difference $n_y-n_x$ are small, they may have influence on the optical retardation R.

Especially in the on state, however, the ratio of liquid crystal molecules aligned substantially vertically is higher in the case where the cell gap D is large than in the case where the cell gap D is small due to less voltage drop by alignment layers 140 and 240, which leads to a state of less optical anisotropy. In addition, the ratio of liquid crystal molecules aligned substantially horizontally is higher in the case where the cell gap D is small than in the case where the cell gap D is large. The difference $n_y-n_x$ becomes small with decreasing the optical anisotropy of the layer. That is, the difference $n_y-n_x$ is small when the cell gap D is large, and is large when the cell gap D is small. Accordingly, it is possible to reduce the influence the variations in cell gap D and difference $n_y-n_x$ have on the optical retardation R.

As described above, the optical retardation R is not readily affected by the variations in cell gap D and difference $n_y-n_x$. In this embodiment, however, the following arrangement may also be used to achieve higher display quality.

The period P may be the half wavelength of visible light, e.g., about 0.3 µm or less. In the on state, this makes stripe-like modulation in the display brightness more difficult to be visually observed, and increases the effect of suppressing glitter caused by light interference.

The period P is, e.g., 0.04 µm or more. If the period P is short, the shape accuracy of the corrugated surfaces formed on the surfaces of the alignment layers 140 and 240 decreases. This may make the effect of increasing the bend configuration unsatisfactory.

Letting H be the height of projections formed on the surfaces of the alignment layers 140 and 240 by the upslopes and the downslopes or vertical surfaces, a ratio H/P of the height H to the period P is, e.g., 0.3 to 1.7. If the ratio H/P is low, the bend configuration stability increasing effect may become unsatisfactory. If the ratio H/P is high, it may become difficult to realize a display contrast ratio equal to or higher than a certain level.

In a pixel in the on state, a difference $\Delta R_{ON}$ between a maximum value $R_{ON-max}$ and minimum value $R_{ON-min}$ of the optical retardation of the optical filter layer 30 may be 5 nm or less. The reason for this condition will be explained below.

According to the MTF, the minimum contrast of bright and dark stripes perceivable by a human is 250:249 to 300:299. This minimum contrast is equivalent to a brightness difference of 0.3% to 0.4%.

Letting $R_{comp}$ be the optical retardation of a multilayered body formed by the pair of optical compensation films 40 and the structure interposed between them, and λ be the wavelength of propagation light, the relative brightness of this liquid crystal display is proportional to $\sin^2(\pi \times R_{comp}/\lambda)$.

If this display is so designed that the wavelength λ is in the green wavelength range and the optical retardation $R_{comp}$ in the on state is zero, a difference of 0.3% to 0.4% in the relative brightness in the on state is equivalent to a difference of about 10 nm in the optical retardation Rcomp in the on state. If the difference $\Delta R_{ON}$ is 5 nm or less, therefore, no brightness variation caused by this difference is visually observed.

The difference $\Delta R_{ON}$ can be decreased by balancing the influence the cell gap D has on the optical retardation R and the influence the difference $n_y-n_x$ has on the optical retardation R. This will be explained below.

First, the relationship between the refractive index and dielectric constant of the optical filter layer 30 will be described.

Figure 4:
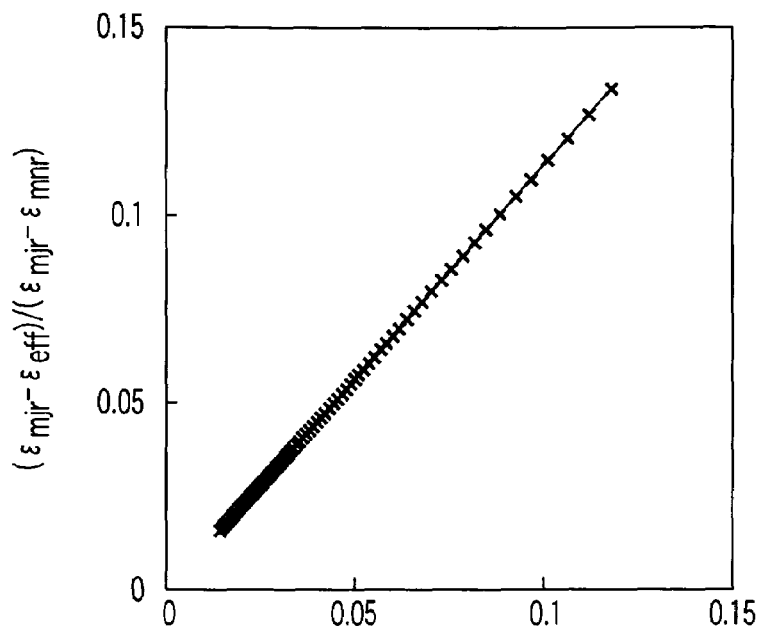
FIG. 4 is a plot showing an example of the relationship between the refractive indices and dielectric constant of an optical filter layer.

FIG. 4 is a plot showing an example of the relationship between the refractive index and dielectric constant of the optical filter layer. Referring to FIG. 4, the abscissa indicates a ratio $(n_y-n_x)/(n_e-n_o)$, and the ordinate indicates a ratio $(\epsilon_{mjr}-\epsilon_{eff})/(\epsilon_{mjr}-\epsilon_{mnr})$. Note that $\epsilon_{eff}$ indicates the effective relative dielectric constant of the optical filter layer 30 in the on state, and can be obtained by capacitance measurement (to be described later). $\epsilon_{mjr}$ and $\epsilon_{mnr}$ indicate the relative dielectric constant in the molecular major axis direction and the relative dielectric constant in the molecular minor axis direction, respectively, of the liquid crystal material. $n_o$ and $n_e$ indicate the ordinary index and extraordinary index, respectively, of the liquid crystal material.

The data shown in FIG. 4 is obtained by using the same liquid crystal material and variously changing the material and shape of the alignment layers 140 and 240.

The difference $n_y-n_x$ in the on state is substantially proportional to the effective relative dielectric constant $\epsilon_{eff}$ of the optical filter layer 30 in the on state. More specifically, letting A be a constant, the difference $n_y-n_x$, relative dielectric constants $\epsilon_{eff}$, $\epsilon_{mjr}$, and $\epsilon_{mnr}$ and refractive indices $n_o$ and $n_e$ satisfy the relationship indicated by equation (9) below. Note that the constant A falls within a range of 1.1±0.1 in a normal liquid crystal material used in an OCB-mode liquid crystal display, and is 1.1 in the example shown in FIG. 4.

$$\frac{\epsilon_{mjr}-\epsilon_{eff}}{\epsilon_{mjr}-\epsilon_{mnr}} = A \times \frac{n_y-n_x}{n_e-n_o} \qquad (9)$$

A method of measuring the relative dielectric constant $\epsilon_{eff}$ will be explained below.

Figure 5:
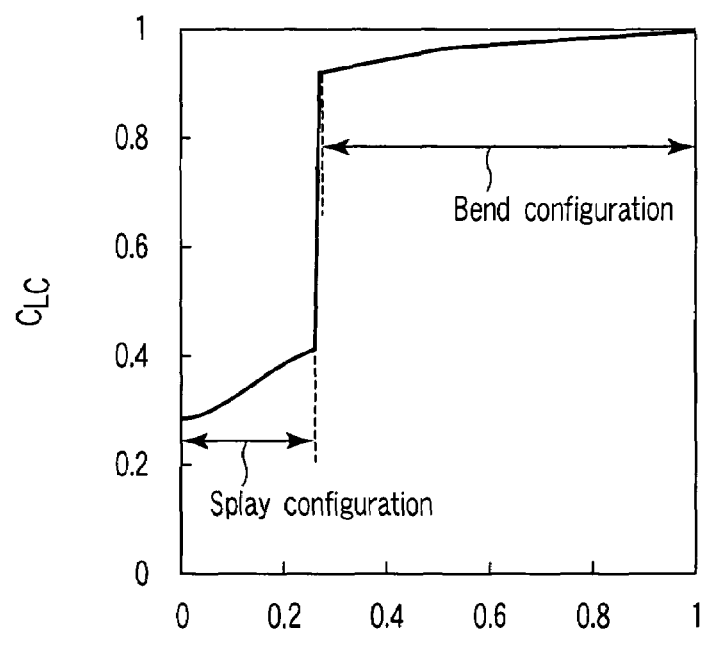
FIG. 5 is a plot showing an example of a change in capacitance with respect to voltage in the liquid crystal display shown in FIGS. 1 to 3.

FIG. 5 is a plot showing an example of the change in capacitance with respect to the applied voltage of the liquid crystal display shown in FIGS. 1 to 3. Referring to FIG. 5, the abscissa indicates a relative value of voltage $V_{app}$ applied between the pixel electrode 130 and common electrode 230, and the ordinate indicates a relative value of capacitance $C_{LC}$ of the optical filter layer 30.

As shown in FIG. 5, the liquid crystal material forms bend configuration in the region where the voltage $V_{app}$ is high. The voltage applied in the on state corresponds to a higher voltage in the high-voltage region in which the liquid crystal material forms bend configuration. Accordingly, the effective relative dielectric constant $\epsilon_{eff}$ of the optical filter layer 30 in the on state can be calculated by substituting a capacitance C in this state, an area S of the pixel electrode 130, and an average value $D_{AV}$ of the cell gap D for the variables in the following equation (10).

$$\varepsilon_{eff} = \frac{C \times D_{AV}}{\varepsilon_0 \times S} \quad (10)$$

Note that $\varepsilon_0$ is the dielectric constant of a vacuum. In practice, the average value $D_{AV}$ of the cell gap D can be regarded as a design value of the cell gap.

Next, the relationship between a voltage applied between the pixel electrode 130 and common electrode 230 and a voltage applied to the optical filter layer 30 in the on state will be explained below.

The section perpendicular to the X-direction of the liquid crystal display shown in FIG. 1, i.e., the section shown in FIG. 3 will be taken as an example. In this section, let y be the Y-coordinate, $D_{AL1}$ (y) be the thickness of the alignment layer 140 at the coordinate y, $D_{AL2}$ (y) be the thickness of the alignment layer 240 at the coordinate y, and $D_{LC}$ (y) be the thickness of the optical filter layer 30 at the coordinate y. Also, let $\varepsilon_{AL1}$ be the relative dielectric constant of the alignment layer 140, $\varepsilon_{AL2}$ be the relative dielectric constant of the alignment layer 240, and $\varepsilon_{LC}$ (y) be the relative dielectric constant of the optical filter layer 30 at the coordinate y. In addition, assume that the dimension in the X-direction of the pixel electrode 130 is $L_X$, the coordinate y at one end of the pixel electrode 130 shown in FIG. 3 is zero, and the coordinate y at the other end is $L_y$.

The pixel electrode 130, the common electrode 230, and the layers interposed between them form a capacitor. The capacitance C of this capacitor can be calculated by assuming that the capacitor is equivalent to a large number of plate capacitors arranged in the Y-direction and connected in parallel, and that each plate capacitor is equivalent to three plate capacitors connected in series, the three plate capacitors being a plate capacitor having the alignment layer 140 as a dielectric layer, a plate capacitor having the optical filter layer 30 as a dielectric layer, and a plate capacitor having the alignment layer 240 as a dielectric layer.

That is, the capacitance C can be obtained by integrating dC(y) represented by equation (11) below from zero to $L_Y$. Note that $dC_{AL1}(y)$, $dC_{LC}(y)$, and $dC_{AL2}(y)$ are represented by equations (12), (13), and (14), respectively.

$$dC(y) = \left[\frac{1}{dC_{AL1}(y)} + \frac{1}{dC_{LC}(y)} + \frac{1}{dC_{AL2}(y)}\right]^{-1} \quad (11)$$

$$dC_{AL1}(y) = \frac{\varepsilon_{AL1} \times \varepsilon_0 \times L_x}{D_{AL1}(y)} \times dy \quad (12)$$

$$dC_{LC}(y) = \frac{\varepsilon_{LC}(y) \times \varepsilon_0 \times L_x}{D_{LC}(y)} \times dy \quad (13)$$

$$dC_{AL2}(y) = \frac{\varepsilon_{AL2} \times \varepsilon_0 \times L_x}{D_{AL2}(y)} \times dy \quad (14)$$

Normally, the sum of $D_{AL1}(y)$, $D_{LC}(y)$, and $D_{AL2}(Y)$ is constant. Also, since the same material is normally used as the alignment layers 140 and 240, the relative dielectric constants $\varepsilon_{AL1}$ and $\varepsilon_{AL2}$ are equal. Accordingly, letting $D_{sum}$ be the sum of $D_{AL1}(y)$, $D_{LC}(y)$, and $D_{AL2}(y)$, equation (11) can be simplified to equation (15) below. Note that even when the materials or thicknesses of the alignment layers 140 and 240 have a significant difference, $D_{sum}$ and $\varepsilon_{AL}$ satisfying equation (15) can be selected as representative values.

$$dC(y) = \left[\frac{D_{LC}(y)}{\varepsilon_{LC}(y)} + \frac{D_{sum} - D_{LC}(y)}{\varepsilon_{AL}}\right]^{-1} \times \varepsilon_0 \times L_x \times dy \quad (15)$$

Letting $V_{app}$ be the voltage applied between the pixel electrode 130 and common electrode 230, the voltage $V_{LC}$ (y) applied to the optical filter layer 30 at the coordinate y can be represented by equation (16) below. Consequently, a relationship indicated by equation (17) is obtained from equations (13), (15), and (16).

$$V_{LC}(y) = \frac{dC(y)}{dC_{LC}(y)} \times V_{app} \quad (16)$$

$$V_{LC}(y) = \frac{V_{app}}{1 + \frac{\varepsilon_{LC}(y)}{\varepsilon_{AL}} \times \left(\frac{D_{sum}}{D_{LC}(y)} - 1\right)} \quad (17)$$

Equation (17) shows that the relative dielectric constant $\varepsilon_{AL}$ of the alignment layers 140 and 240 and the voltage $V_{LC}(y)$ have a positive correlation. Also, the relationship between the voltage $V_{app}$ and the capacitance C of the optical filter layer 30 shown in FIG. 5 indicates that within the voltage range corresponding to the on state, the relative dielectric constant $\varepsilon_{LC}(y)$ monotonically increases and approaches the relative dielectric constant $\varepsilon_{mjr}$ as the voltage $V_{LC}(y)$ rises.

Accordingly, the voltage $V_{LC}(y)$ is larger and the relative dielectric constant $\varepsilon_{LC}(y)$ is closer to the relative dielectric constant $\varepsilon_{mjr}$ when a material having a large relative dielectric constant $\varepsilon_{AL}$ is used as the alignment layers 140 and 240 than when a material having a small relative dielectric constant $\varepsilon_{AL}$ is used as the alignment layers 140 and 240. That is, the optical retardation $R_{ON}$ in the on state when a material having a large relative electric constant $\varepsilon_{AL}$ is used as the alignment layers 140 and 240 is smaller than that when a material having a small relative dielectric constant $\varepsilon_{AL}$ is used as the alignment layers 140 and 240.

As described above, the physical properties of the alignment layers 140 and 240 and liquid crystal material have influence on the optical retardation $R_{ON}$ in the on state. The influence the relative dielectric constant $\varepsilon_{AL}$ of the alignment layers 140 and 240 and the relative dielectric constant $\varepsilon_{mjr}$ of the liquid crystal material have on the optical retardation $R_{ON}$ will be explained below with reference to FIG. 6.

Figure 6:
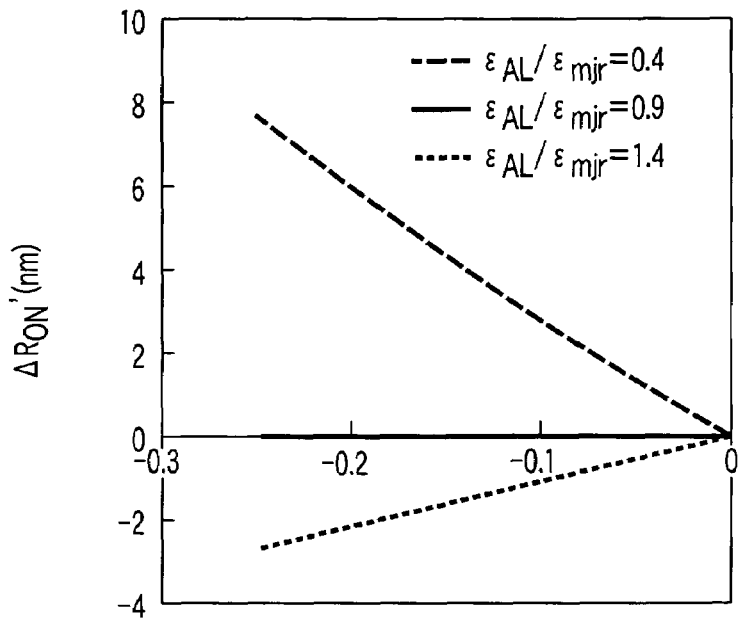
FIG. 6 is a plot showing an example of the relationship between the thickness and optical retardation of the optical filter layer.

FIG. 6 is a plot showing an example of the relationship between the thickness and optical retardation of the optical filter layer. Referring to FIG. 6, the abscissa indicates a ratio $[D_{LC}(y)-D_{max}]/D_{max}$ of a difference $D_{LC}(y)-D_{max}$ between the thickness $D_{LC}(y)$ of the optical filter layer 30 and the maximum value $D_{max}$ of the thickness to the maximum value $D_{max}$ of the cell gap. The ordinate indicates a difference $\Delta R_{ON}'$ between the optical retardation $R_{ON}$ of the optical filter layer 30 in the on state at a position where the cell gap is the maximum value $D_{max}$ and the optical retardation $R_{ON}$ of the optical filter layer 30 in the on state at a position where the cell gap is the minimum value $D_{min}$.

Note that the data shown in FIG. 6 is obtained for the liquid crystal display panel 1 in which an inclination angle α of upslopes formed on the alignment layers 140 and 240 is 45°, and liquid crystal molecules are aligned parallel to these upslopes near the alignment layers 140 and 240. Note also that the absolute value of the difference $\Delta R_{ON}'$ is equal to the difference $\Delta R_{ON}$ described earlier.

As shown in FIG. 6, when the ratio $\in_{AL}/\in_{mjr}$ is 0.4, the difference $\Delta R_{ON}'$ increases as the thickness $D_{LC}(y)$ of the optical filter layer 30 decreases. When the ratio $\in_{AL}/\in_{mjr}$ is 1.4, the difference $\Delta R_{ON}'$ decreases as the thickness $D_{LC}(y)$ of the optical filter layer 30 decreases. When the ratio $\in_{AL}/\in_{mjr}$ is 0.9, the difference $\Delta R_{ON}'$ is constant regardless of the thickness $D_{LC}(y)$ of the optical filter layer 30.

From the foregoing, the difference $\Delta R_{ON}$ can be decreased by appropriately setting the ratio $\in_{AL}/\in_{mjr}$. Also, if the minimum value $D_{min}$ is large, the difference $\Delta R_{ON}$ is small. To decrease the difference $\Delta R_{ON}$ to, e.g., 5 nm or less, therefore, the ratio $\in_{AL}/\in_{mjr}$ can be used in addition to the minimum value $D_{min}$.

Note that as shown in FIG. 6, the increase in difference $\Delta R_{ON}'$ with respect to the decrease in thickness $D_{LC}(y)$ when the ratio $\in_{AL}/\in_{mjr}$ is 0.4 is larger than the decrease in difference $\Delta R_{ON}'$ with respect to the decrease in thickness $D_{LC}(y)$ when the ratio $\in_{AL}/\in_{mjr}$ is 1.4. From the foregoing, within the range of the ratio $\in_{AL}/\in_{mjr}$ capable of decreasing the change in difference $\Delta R_{ON}'$ with respect to the change in thickness $D_{LC}(y)$, the difference between the optimum value (=0.9) and the minimum value is expected to be smaller than the difference between the maximum value and the optimum value. This tendency was actually examined by variously changing the material of the alignment layers 140 and 240 and the liquid crystal material. As a consequence, the ratio $\in_{AL}/\in_{mjr}$ did not exceed 1.0, and it was possible to decrease the change in difference $\Delta R_{ON}'$ with respect to the change in $D_{LC}(y)$ when the ratio $\in_{AL}/\in_{mjr}$ was 0.7 or more. Accordingly, it is normally only necessary to determine not the maximum value but the minimum value of the ratio $\in_{AL}/\in_{mjr}$.

Next, the relationship between the variation in thickness of the optical filter layer 30 and the minimum value of the ratio $\in_{AL}/\in_{mjr}$ capable of sufficiently decreasing the difference $\Delta R_{ON}$ will be explained below with reference to FIG. 7.

Figure 7:
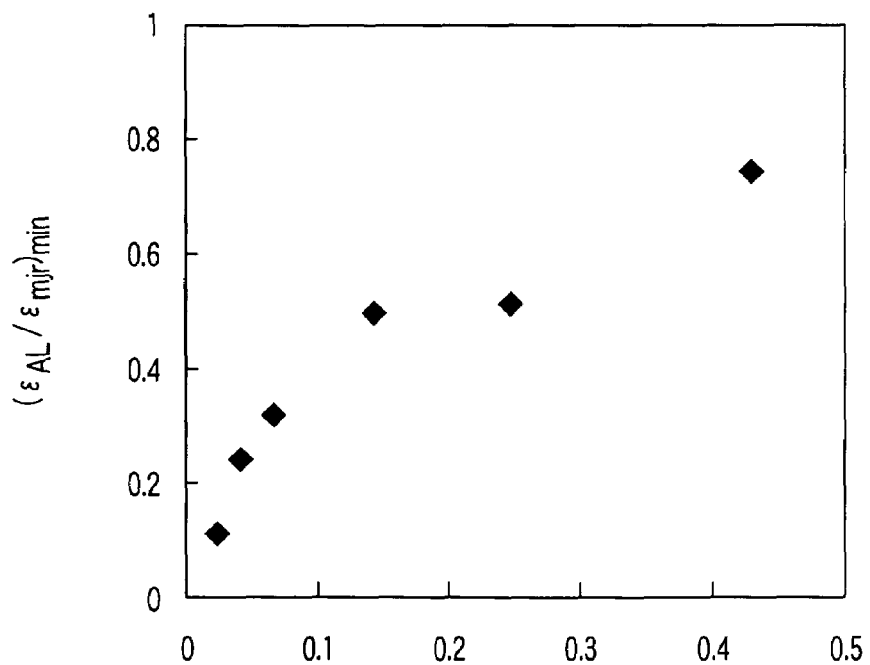
FIG. 7 is a plot showing an example of the relationship between the variation in thickness of the optical filter layer and the minimum value of the ratio $\in_{AL}/\in_{mjr}$ by which the difference $\Delta R_{ON}$ can be sufficiently decreased.

FIG. 7 is a plot showing an example of the relationship between the variation in thickness of the optical filter layer and the minimum value of the ratio $\in_{AL}/\in_{mjr}$ capable of sufficiently decreasing the difference $\Delta R_{ON}$. Referring to FIG. 7, the abscissa indicates a ratio $(D_{max}-D_{min})/D_{max}$ of a difference $D_{max}-D_{min}$ between the maximum value $D_{max}$ and minimum value $D_{min}$ of the thickness of the optical filter layer 30 to the maximum value $D_{max}$. The ordinate indicates a minimum value $(\in_{AL}/\in_{mjr})_{min}$ of the ratio $\in_{AL}/\in_{mjr}$ which decreases the difference $\Delta R_{ON}$ to 5 nm or less.

As shown in FIG. 7, when the ratio $(D_{max}-D_{min})/D_{max}$ is less than about 0.1, the minimum value $(\in_{AL}/\in_{mjr})_{min}$ is substantially proportional to the ratio $(D_{max}-D_{min})/D_{max}$. Also, as shown in FIG. 7, when the ratio $(D_{max}-D_{min})/D_{max}$ is about 0.1 or more, the increase in minimum value $(\in_{AL}/\in_{mjr})_{min}$ with respect to the ratio $(D_{max}-D_{min})/D_{max}$ is significantly small. When the ratio $(D_{max}-D_{min})/D_{max}$ is 0.4 or less, the minimum value $(\in_{AL}/\in_{mjr})_{min}$ is 0.5 or less.

A case in which the ratio $(D_{max}-D_{min})/D_{max}$ is 0.1 is equivalent to a case in which the maximum value $R_{ON-max}$ of the optical retardation $R_{ON}$ of the optical filter layer 30 in the on state is about 50 nm and the difference $\Delta R_{ON}$ between the maximum value $R_{ON-max}$ and minimum value $R_{ON-min}$ of the optical retardation $R_{ON}$ is about 5 nm.

Accordingly, the difference $\Delta R_{ON}$ can be sufficiently decreased if the relative dielectric constants $\in_{AL}$ and $\in_{mjr}$, maximum value $D_{max}$, minimum value $D_{min}$, and maximum value $R_{ON-max}$ satisfy relationships indicated by inequalities (1) and (2) below or satisfy relationships indicated by inequalities (3) and (4) below.

$$\frac{D_{max} - D_{min}}{D_{max}} < \frac{5}{R_{ON-max}} \quad (1)$$

$$\varepsilon_{AL} \geq \frac{0.5}{\left(\frac{5}{R_{ON-max}}\right)} \times \frac{D_{max} - D_{min}}{D_{max}} \times \varepsilon_{mjr} \quad (2)$$

$$\frac{D_{max} - D_{min}}{D_{max}} \geq \frac{5}{R_{ON-max}} \quad (3)$$

$$\varepsilon_{AL} \geq 0.5 \times \varepsilon_{mjr} \quad (4)$$

A difference $\Delta(R_{OFF}-R_{ON})$ between the maximum value and minimum value of a difference $R_{OFF}-R_{ON}$, which is a difference between the optical retardation $R_{OFF}$ in the off state and the optical retardation $R_{ON}$ in the on state of the optical filter layer 30, may also be 5 nm or less. In this case, no light leak readily occurs in the on state, and a higher brightness can be realized in the off state.

Letting $(R_{OFF}-R_{ON})_{max}$ be the maximum value (nm) of the difference $R_{OFF}-R_{ON}$, in each of the alignment layers 140 and 240, the period P of the periodic structure and a value $P_{lim}$, which is calculated by substituting the inclination angle α of the upslopes and the maximum value $(R_{OFF}-R_{ON})_{max}$ for the variables in the following equation (5), may satisfy a relationship indicated by inequality (6) below. Alternatively, in each of the alignment layers 140 and 240, the period P and value $P_{lim}$ may satisfy a relationship indicated by inequality (7) below, and the relative dielectric constants $\in_{AL}$ and $\in_{mjr}$, period P, and value $P_{lim}$ may satisfy a relationship indicated by inequality (8) below.

$$P_{lim} = \frac{D_{max}}{2 \times \tan\alpha} \times \frac{5}{(R_{OFF}-R_{ON})_{max}} \quad (5)$$

$$P \leq 0.6 \times P_{lim} \quad (6)$$

$$P > 0.6 \times P_{lim} \quad (7)$$

$$\varepsilon_{AL} \geq \left[\frac{9}{4} \times \left(\frac{P}{P_{lim}} - 0.6\right) + 0.1\right] \times \varepsilon_{mjr} \quad (8)$$

Figure 8:
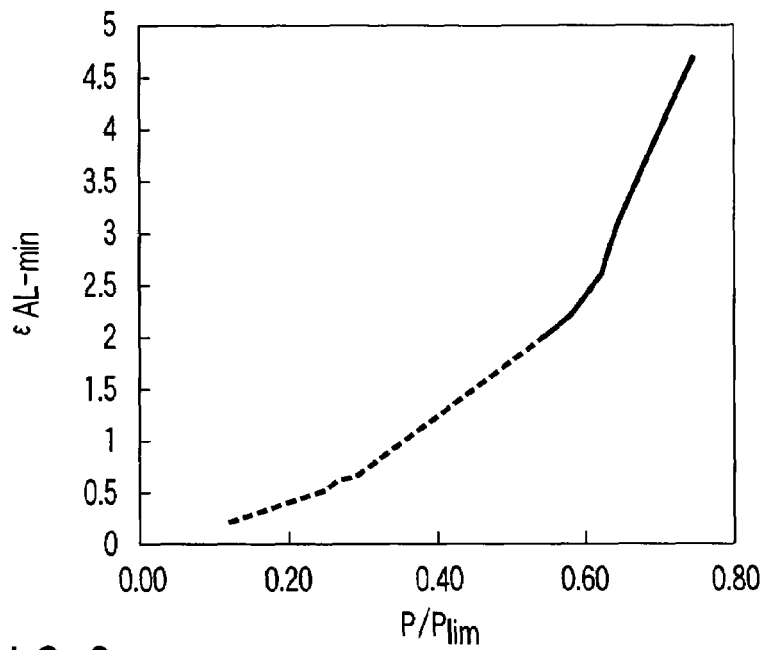
FIG. 8 is a plot showing an example of the relationship between the ratio $P/P_{lim}$ and the relative dielectric constant of an alignment layer.

FIG. 8 is a plot showing an example of the relationship between a ratio $P/P_{lim}$ and the relative dielectric constant of the alignment layer. Referring to FIG. 8, the abscissa indicates the ratio $P/P_{lim}$ of the period P to the value $P_{lim}$. The ordinate indicates a minimum value $\in_{AL-min}$ of the relative dielectric constant $\in_{AL}$ capable of decreasing the difference $\Delta R_{ON}$ to 5 nm or less. Note that the data shown in FIG. 8 is obtained for the liquid crystal display panel 1 in which the relative dielectric constant $\in_{mjr}$ of the liquid crystal material is about 19.

As shown in FIG. 8, when the ratio $P/P_{lim}$ is 0.6 or less, the minimum value $\in_{AL-min}$ is about 2 or less. Normally, no material having a relative dielectric constant $\in_{AL}$ of about 2 or less is used as the alignment layers 140 and 240. Also, as shown in FIG. 8, when the ratio $P/P_{lim}$ is larger than 0.6, the minimum value $\in_{AL-min}$ is substantially proportional to the ratio $P/P_{lim}$.

Accordingly, the difference $\Delta R_{ON}$ can be sufficiently decreased if the period P, inclination angle α, and value $P_{lim}$ satisfy the relationship indicated by inequality (6) above, or if the period P and value $P_{lim}$ satisfy the relationship indicated by inequality (7) above and the relative dielectric constant $\in_{AL}$, period P, and value $P_{lim}$ satisfy the relationship indicated by inequality (8) above.

Various structures can be used in the liquid crystal display described above.

FIGS. 9 to 13 are sectional views schematically showing examples of structures usable in the liquid crystal display shown in FIGS. 1 to 3. FIGS. 9 to 13 each illustrate the section shown in FIG. 3 in an enlarged scale, and some components are omitted from each drawing.

Figure 9:
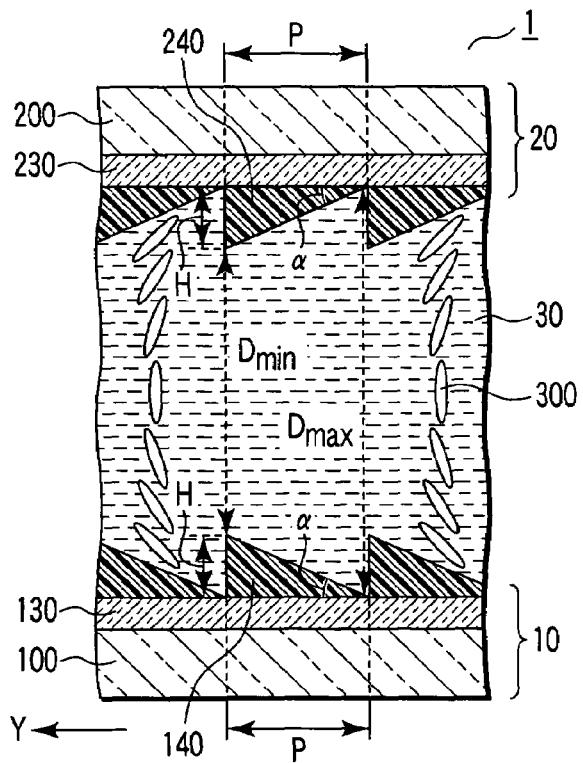
FIGS. 9 to 13 are sectional views each schematically showing an example of a structure usable in the liquid crystal display shown in FIGS. 1 to 3.
Figure 10:
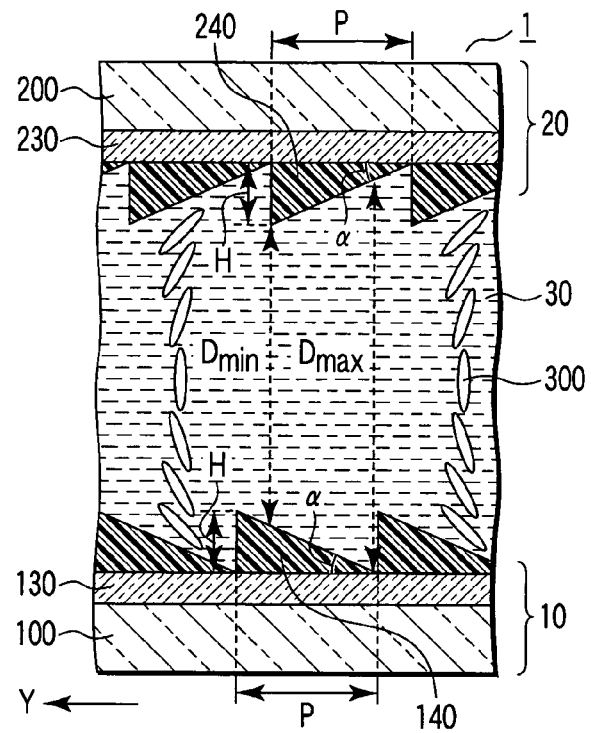

In the structures shown in FIGS. 9 and 10, the surface of each of the alignment layers 140 and 240 is a corrugated surface obtained by alternately joining upslopes and vertical surfaces in the Y-direction. Each upslope is a plane surface, and inclined with respect to the main surfaces of the substrates 100 and 200 at the inclination angle α. Also, the sectional shape of a projection formed by the upslope and vertical surface is a right-angled triangle.

The pitch P of the periodic structure formed by the upslope on the alignment layer 140 is equal to the pitch P of the periodic structure formed by the upslope on the alignment layer 240. Also, the height H of the projection formed by the upslope and vertical surface on the alignment layer 140 is equal to the height H of the projection formed by the upslope and vertical surface on the alignment layer 240.

In the structure shown in FIG. 9, the projections of the alignment layers 140 and 240 are formed in the same positions in the Y-direction. In contrast, in the structure shown in FIG. 10, the projections of the alignment layers 140 and 240 are formed in different positions in the Y-direction. Therefore, the difference $D_{max}-D_{min}$ between the maximum value $D_{max}$ and minimum value $D_{min}$ of the cell gap in the structure shown in FIG. 10 is smaller than that in the structure shown in FIG. 9.

Figure 11:
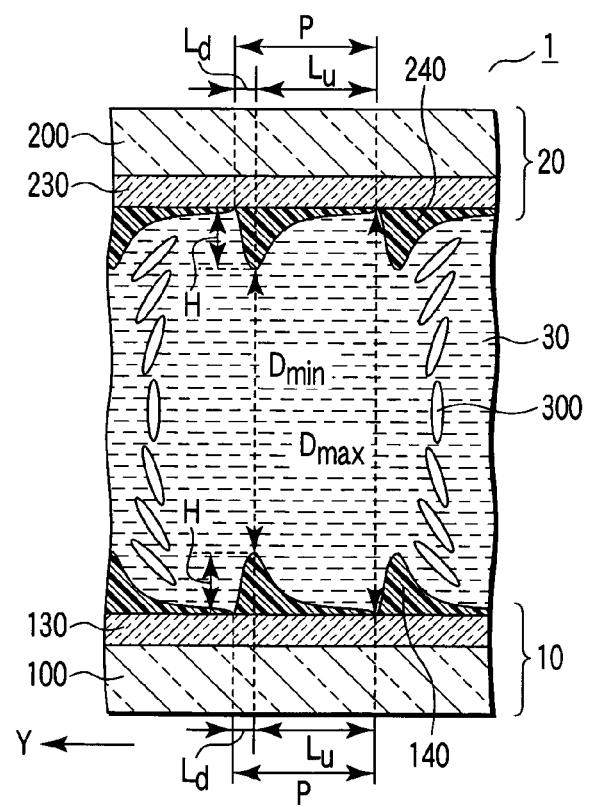
Figure 12:
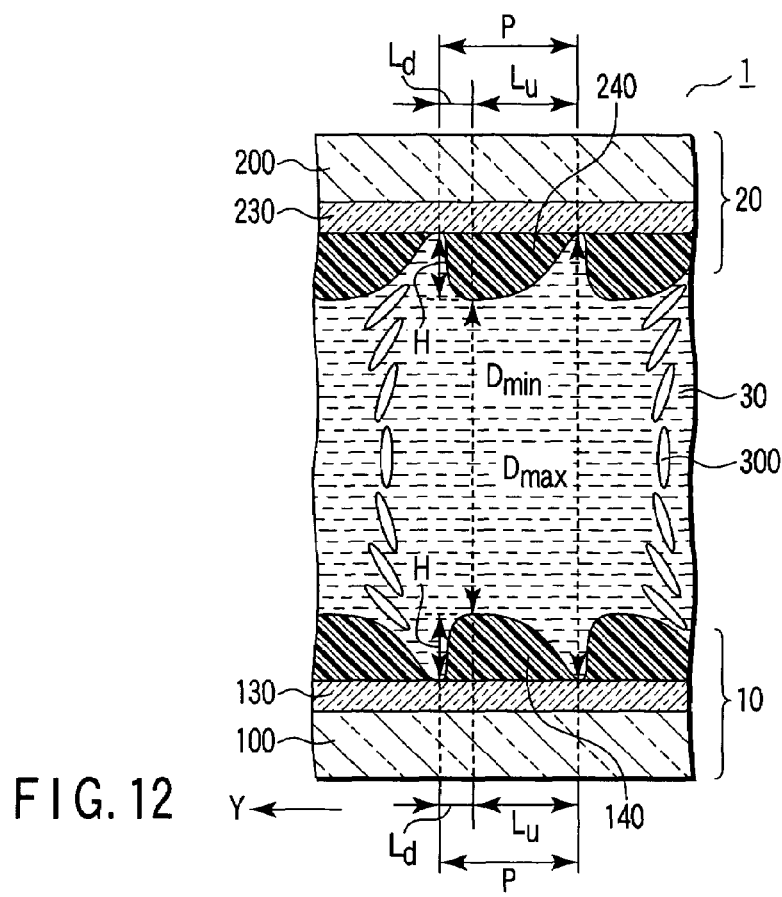

In the structures shown in FIGS. 11 and 12, the surface of each of the alignment layers 140 and 240 is a corrugated surface obtained by alternately joining upslopes and downslopes steeper than the upslopes in the Y-direction.

A length $L_u$ in the Y-direction of the upslope is larger than a length $L_d$ in the Y-direction of the downslope, and is typically twice or more the length $L_d$. Note that the sum of the lengths $L_u$ and $L_d$ is normally equal to the period P. In the structures shown in FIGS. 11 and 12, each of the upslopes and downslopes is a curved surface. In the structure shown in FIG. 11, the upslope has a substantially concave shape. In the structure shown in FIG. 12, the upslope has a substantially convex shape. That is, the upslope need not be a plane surface.

Figure 13:
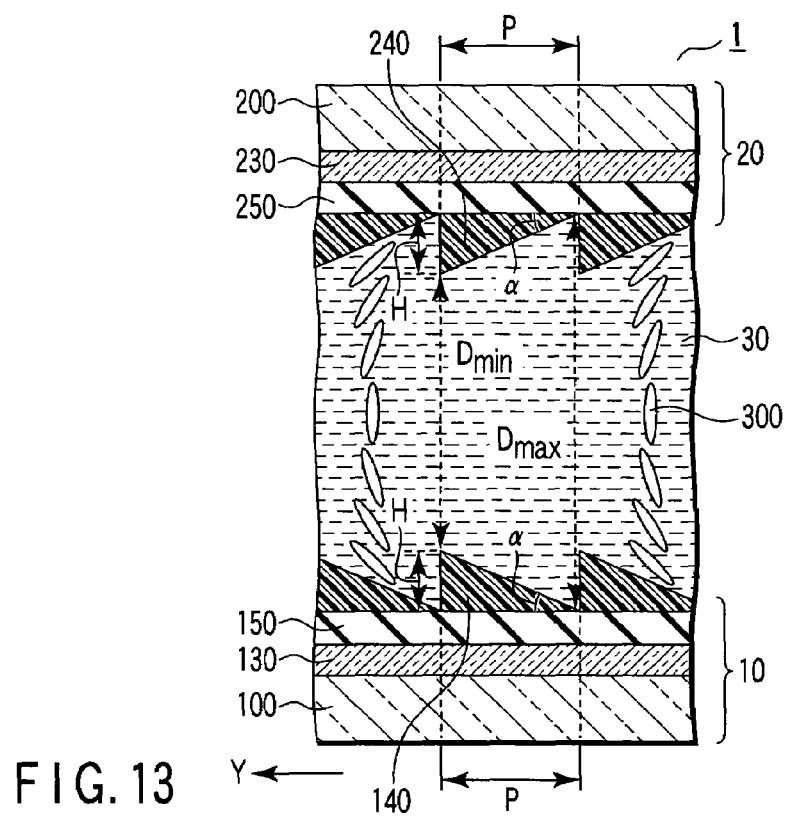

In the structure shown in FIG. 13, the alignment layers 140 and 240 have a structure similar to that shown in FIG. 9. In the structure shown in FIG. 13, however, a planarizing layer 150 is formed between the alignment layer 140 and pixel electrode 130, and a planarizing layer 250 is formed between the alignment layer 240 and common electrode 230. The planarizing layers 150 and 250 are transparent, and made of an inorganic insulator layer, an organic insulator layer, or a multilayered film including an inorganic insulator layer and organic insulator layer. The planarizing layers 150 and 250 facilitate the formation of the alignment layers 140 and 240 having high shape accuracy.

Note that in an active matrix liquid crystal display, the underlayer on which the alignment layer 240 is formed is normally well flat. Therefore, the planarizing layer 150 alone may also be formed without forming the planarizing layer 250. It is also possible that at least one of the planarizing layers 150 and 250 has the function of, e.g., a color filter, black matrix, peripheral light-shielding layer, or optical compensation film.

In the structures shown in FIGS. 11 to 13, the projections of the alignment layers 140 and 240 may also be formed in different positions in the Y-direction as shown in FIG. 10.

In the structures shown in FIGS. 9 to 13, a mirror image of the sectional shape of the alignment layer 140 matches the sectional shape of the alignment layer 240. However, they may be different. For example, the alignment layer 140 shown in FIG. 9 may be used together with the alignment layer 240 shown in FIG. 11 or 12. Alternatively, the alignment layers 140 and 240 may be different in at least one of the height H, period P, and length $L_u$.

If the sectional shape of the alignment layer 140 matches that of the alignment layer 240 and the same material is used as the alignment layers 140 and 240, the symmetry of the liquid crystal configuration near the alignment layer 140 and the liquid crystal configuration near the alignment layer 240 increases. That is, the symmetry of bend configuration increases. This symmetry improves the display quality, and also prevents easy occurrence of image burn.

Each projection on the alignment layers 140 and 240 typically has a straight band shape when viewed in a direction perpendicular to the main surface of the substrate 100 (a direction perpendicular to the X-direction and Y-direction). Alternatively, each projection on the alignment layers 140 and 240 may have a curved band shape when viewed in the direction perpendicular to the main surface of the substrate 100.

Each projection on the alignment layer 140 may be either continuous or discontinuous from one end to the other of the alignment layer 140. Similarly, each projection on the alignment layer 240 may be either continuous or discontinuous from one end to the other of the alignment layer 240. For example, these projections may be divided between pixels adjacent in the X-direction. In this case, the positions of the projections in the Y-direction may be different between pixels adjacent in the X-direction.

The alignment layers 140 and 240 may have a single-layered structure including an organic insulating layer having a corrugated surface. Alternatively, the alignment layers 140 and 240 may have a multilayered structure including an inorganic insulating layer having a corrugated surface and an organic insulating layer formed on it. In the latter case, if the organic insulating layer is sufficiently thin, the surface of the organic insulating layer is also corrugated in conformity with the corrugated surface of the inorganic insulating layer.

The arrangement direction of the upslopes formed on the alignment layers 140 and 240 need not be the Y-direction. For example, the direction may be the X-direction.

The alignment layers 140 and 240 having the corrugated surfaces can be formed by using, e.g., transfer.

Figure 14:
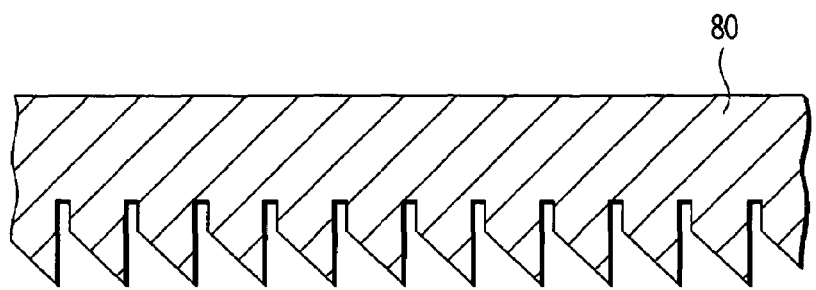
FIG. 14 is a sectional view schematically showing a transfer member which can be used to form an alignment layer having a corrugated surface.

FIG. 14 is a sectional view schematically showing a transfer member usable to form an alignment layer having a corrugated surface. As shown FIG. 14, a plurality of grooves are formed in the transfer surface of a transfer member 80 in conformity with corrugated surfaces to be formed on the alignment layers 140 and 240. Each groove has a structure in which a groove having a rectangular section is formed on the bottom of a groove having a forward tapered section. This groove having the forward tapered section has a shape corresponding to a projection to be formed on the surfaces of the alignment layers 140 and 240. Also, the groove having the rectangular section functions as a gas vent passage through which air escapes from between the transfer member 80 and the alignment layer 140 or 240 during transfer.

When the transfer member 80 is used, the alignment layers 140 and 240 can be formed by, e.g., the following method.

First, a resin layer made of polyimide or the like is formed on a substantially flat underlayer. Spin coating or the like can be used in the formation of this resin layer. Then, the transfer surface of the transfer member 80 is pressed against this resin layer, and the resin layer is pre-cured in this state. After that, the transfer member 80 is removed from the resin layer, and the resin layer is completely cured. In this manner, a resin layer having a corrugated surface is obtained. In addition, this resin layer is rubbed along the arrangement direction of the upslopes. In this way, the alignment layers 140 and 240 can be obtained.

In this method, the rubbing process is performed after the surface of the resin layer is corrugated. However, the rubbing process may also be performed before the surface of the resin layer is corrugated. When the rubbing process is performed after the surface of the resin layer is corrugated, alignment layers 140 and 240 with strong force to regulate the liquid crystal configuration may be obtained. When the rubbing process is performed before the surface of the resin layer is corrugated, alignment layers 140 and 240 in which the in-plane variation of the force to regulate the liquid crystal configuration is small may be obtained.

When the transfer member 80 shown in FIG. 14 is used, the alignment layers 140 and 240 may be formed by, e.g., the following method.

First, an inorganic insulating layer and first resin layer are sequentially formed on a substantially flat underlayer. Then, the transfer surface of the transfer member 80 is pressed against the resin layer, and the resin layer is pre-cured in this state. After that, the transfer member 80 is removed from the resin layer, and the resin layer is completely cured. In this manner, a resin layer having a corrugated surface is obtained.

Then, this resin layer having the corrugated surface is used as a mask to perform etching, e.g., reactive ion etching. As a consequence, the surface of the underlying inorganic insulating layer is corrugated.

After that, a resin layer made of polyimide or the like is formed on the inorganic insulating layer having the corrugated surface. This resin layer is formed to be sufficiently thin so that its surface is corrugated in conformity with the underlayer. In addition, this resin layer is rubbed along the arrangement direction of the upslopes. In this way, the alignment layers 140 and 240 can be obtained.

Although the liquid crystal display shown in FIGS. 1 to 3 uses the pair of optical compensation films 40, only one optical compensation film may be used. For example, it is possible to form an optical compensation film only on the outer surface of the front substrate 20 without forming any optical compensation film on the outer surface of the back substrate 10. In this case, as the optical compensation film formed on the outer surface of the front substrate 20, an optical compensation film capable of singly achieving the same function as achieved by the pair of optical compensation films 40 is used.

Also, the optical compensation films 40 are used in the liquid crystal display shown in FIGS. 1 to 3, but the optical compensation films 40 may be omitted. That is, the display mode of the liquid crystal display according to this embodiment may be either the OCB-mode or a n cell using no optical compensation film. In addition, this liquid crystal display typically uses a liquid crystal material having positive dielectric anisotropy. However, if bend configuration can be stably formed in both the on and off states, a liquid crystal material having negative dielectric anisotropy may be used.

Although FIGS. 1 to 3 illustrate the active matrix liquid crystal display, the liquid crystal display may use another driving method, e.g., a passive matrix driving method.

Figure 15:
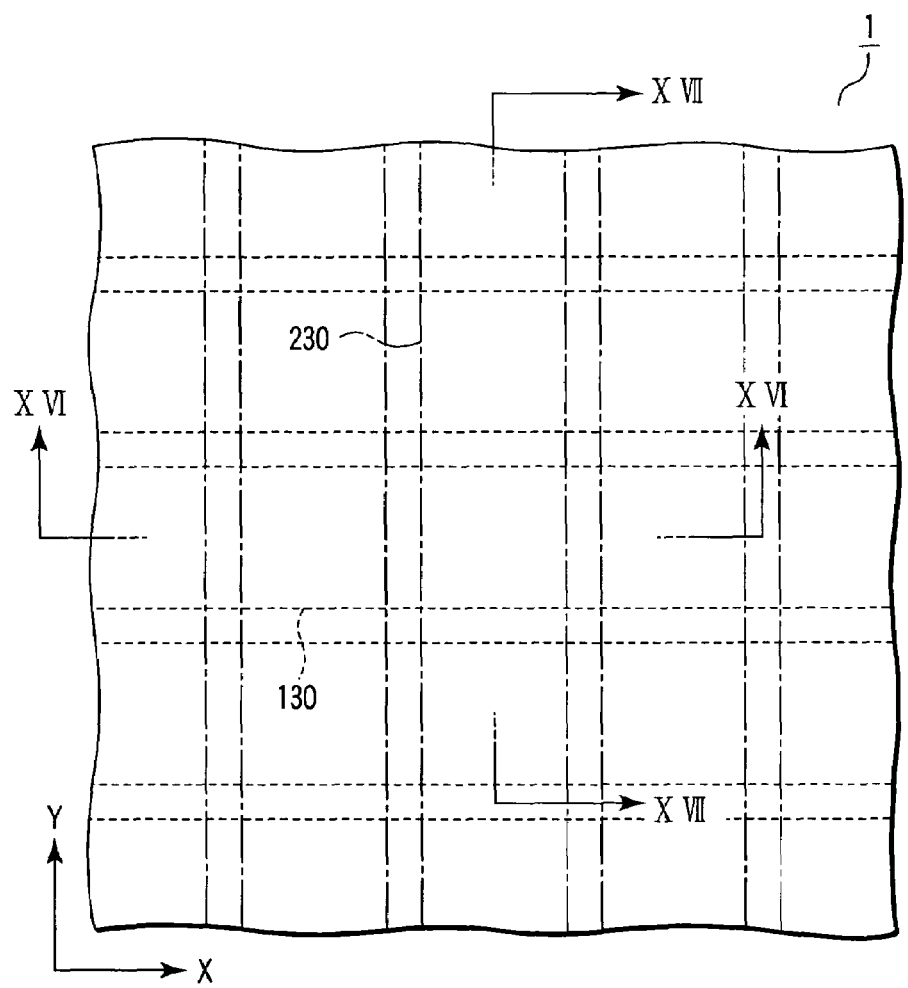
FIG. 15 is a plan view schematically showing a liquid crystal display according to the second embodiment of the present invention.
Figure 16:
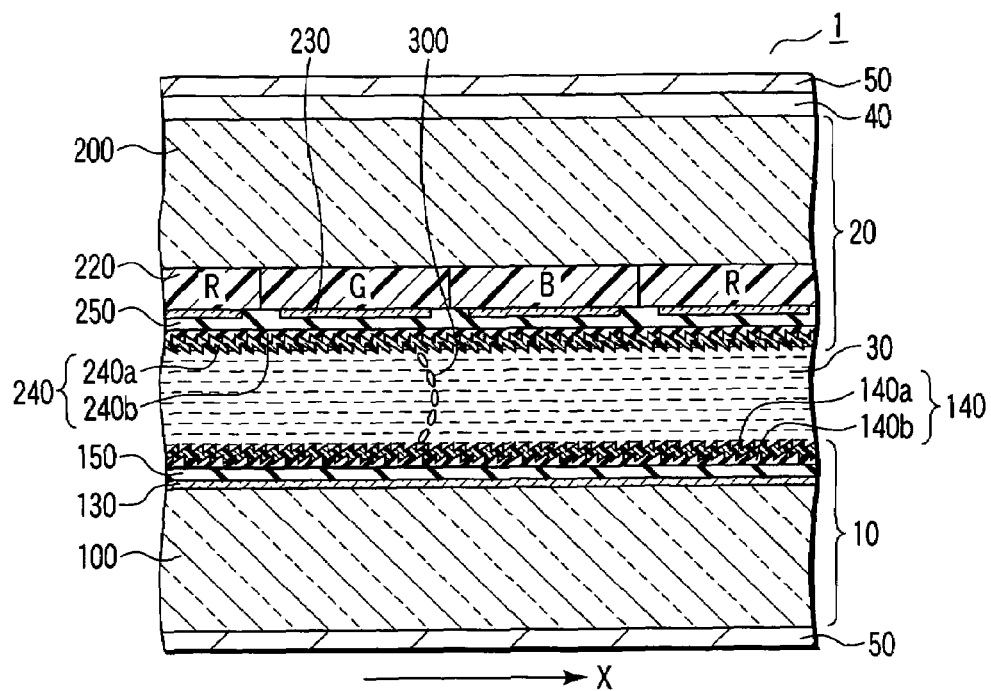
FIG. 16 is a sectional view taken along a line XVI-XVI of the liquid crystal display shown in FIG. 15.
Figure 17:
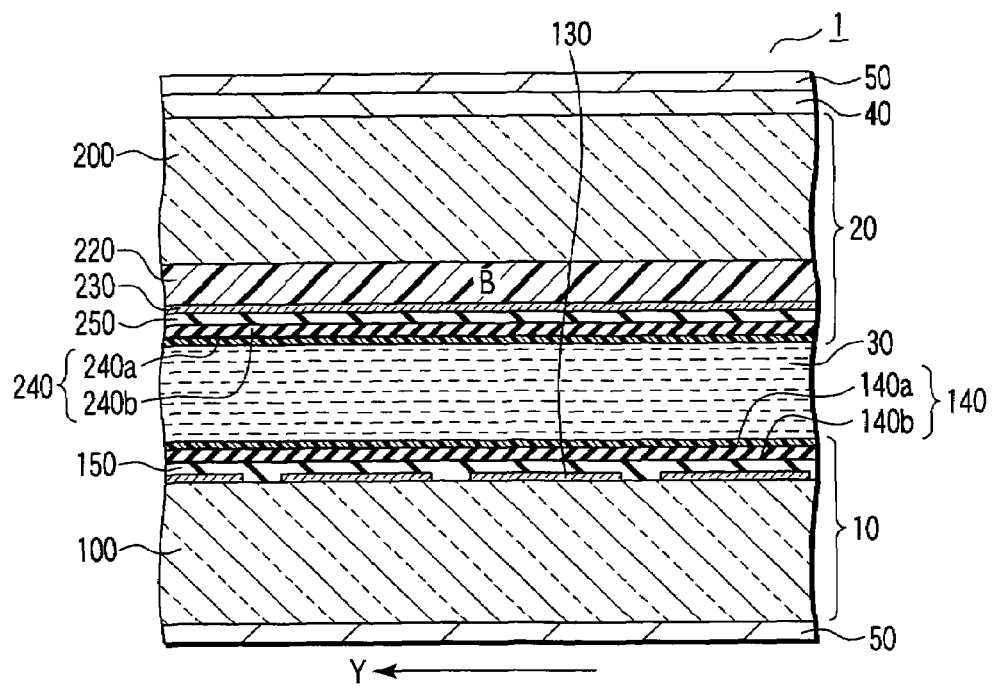
FIG. 17 is a sectional view taken along a line XVII-XVII of the liquid crystal display shown in FIG. 15.

FIG. 15 is a plan view schematically showing a liquid crystal display according to the second embodiment of the present invention. FIG. 16 is a sectional view taken along a line XVI-XVI of the liquid crystal display shown in FIG. 15. FIG. 17 is a sectional view taken along a line XVII-XVII of the liquid crystal display shown in FIG. 15. Note that a color filter 220 (to be described later) is omitted from FIG. 15.

This liquid crystal display is an OCB-mode passive matrix liquid crystal display, and includes a liquid crystal display panel 1, and a backlight (not shown) which faces the liquid crystal display panel 1.

As shown in FIGS. 16 and 17, the liquid crystal display panel 1 includes a back substrate 10 and front substrate 20. A frame-like adhesive layer (not shown) is interposed between the back substrate 10 and front substrate 20. A space surrounded by the back substrate 10, front substrate 20, and adhesive layer is filled with a liquid crystal material which forms an optical filter layer 30. A polarizer 50 is placed on the outer surface of the back substrate 10. An optical compensation film 40 and polarizer 50 are sequentially arranged on the outer surface of the front substrate 20.

On a back substrate 100, band-like X electrodes 130 running in an X-direction are arranged in a Y-direction. The X electrodes 130 are made of a transparent conductor such as ITO.

The back substrate 100 and X electrodes 130 are covered with a planarizing layer 150. On the planarizing layer 150, an inorganic insulating layer 140b and organic insulating layer 140a are sequentially formed. The organic insulating layer 140a and inorganic insulating layer 140b form an alignment layer 140.

Of the surface of the inorganic insulating layer 140b, a region corresponding to the intersection of the X electrode 130 and Y electrode 230 (to be described later) includes a corrugated surface obtained by alternately joining upslopes and downslopes steeper than the upslopes or vertical surfaces. The corrugated surface of the inorganic insulating layer 140b forms a corrugated surface on the organic insulating layer 140a. In this embodiment, as shown in FIG. 16, substantially the whole of the organic insulating layer 140a and inorganic insulating layer 140b includes a corrugated surface obtained by alternately joining upslopes and vertical surfaces in the X-direction. The organic insulating layer 140a is rubbed in, e.g., substantially the same direction as the arrangement direction of the upslopes, i.e., the X-direction in this embodiment.

A color filter 220 is formed on the surface of a substrate 200 facing the back substrate 10. The color filter 220 includes a plurality of coloring layers different in absorption spectrum, e.g., a green coloring layer G, blue coloring layer B, and red coloring layer R. In this embodiment, the coloring layers G, B, and R have a band-like shape which runs in the Y-direction as shown in FIG. 17, and are arranged in the X-direction as shown in FIG. 16, thereby forming a stripe pattern. As the coloring layers G, B, and R, it is possible to use, e.g., a mixture of a transparent resin and a dye and/or a pigment. Note that the color filter 220 is formed on the front substrate 20 in this embodiment, but it may be formed on the back substrate 10.

On the color filter 220, band-like Y electrodes 230 running in the Y-direction are arranged in the X-direction. Gaps between the adjacent Y electrodes 230 are positioned on the boundaries between the coloring layers G, B, and R of the color filter 220. The Y electrodes 230 are made of a transparent conductor.

The color filter 220 and Y electrodes 230 are covered with a planarizing layer 250. On the planarizing layer 250, an inorganic insulating layer 240b and organic insulating layer 240a are sequentially formed. The organic insulating layer 240a and inorganic insulating layer 240b form an alignment layer 240.

Of the surface of the inorganic insulating layer 240b, a region corresponding to the intersection of the X electrode 130 and Y electrode 230 includes a corrugated surface obtained by alternately joining upslopes and downslopes steeper than the upslopes or vertical surfaces. The corrugated surface of the inorganic insulating layer 240b forms a corrugated surface on the organic insulating layer 240a. In this embodiment, as shown in FIG. 16, substantially the whole of the organic insulating layer 240a and inorganic insulating layer 240b includes a corrugated surface obtained by alternately joining upslopes and vertical surfaces in the X-direction. The organic insulating layer 240a is rubbed in, e.g., substantially the same direction as the arrangement direction of the upslopes, i.e., the X-direction in this embodiment.

A frame-like adhesive layer (not shown) is interposed between the back substrate 10 and front substrate 20. In addition, granular spacers (not shown) are arranged between the back substrate 10 and front substrate 20 and inside the frame formed by the adhesive layer. Note that columnar spacers may be used instead of the granular spacers.

The optical filter layer 30 contains a liquid crystal material having positive dielectric anisotropy and positive refractive index anisotropy. This liquid crystal material forms bend configuration while a voltage is applied between the X electrodes 130 and Y electrodes 230.

The optical compensation film 40 is, e.g., a biaxial film. As the optical compensation film 40, it is possible to use a film including an optically anisotropic layer in which a uniaxial compound having negative refractive index anisotropy, e.g., discotic liquid crystal compound, forms bend configuration such that the optical axis thereof changes in a plane perpendicular to the Y-direction.

For example, the polarizers 50 are so arranged that their transmission axes are substantially perpendicular to each other. Each polarizer 50 may be placed such that its transmission axis makes an angle of about 45° with the X-direction and Y-direction.

The backlight (not shown) illuminates the back substrate 10 of the liquid crystal display panel 1.

The same effects as explained with reference to the active matrix liquid crystal display shown in FIGS. 1 to 3 can be obtained by the passive matrix liquid crystal display shown in FIGS. 15 to 17 as well. That is, the driving method of the liquid crystal display is not particularly limited.

Examples of the present invention will be described below.

EXAMPLE 1

In this example, the OCB-mode liquid crystal display shown in FIGS. 1 to 3 was manufactured by the following method. Note that the structure shown in FIG. 13 was used in this liquid crystal display, and the period P and inclination angle α of the alignment layers 140 and 240 were set at about 0.15 μm and 45°, respectively. In this example, the optical compensation film 40 was formed not on the outer surface of the back substrate 10, but only on the outer surface of the front substrate 20.

First, a structure from an undercoat layer 101 to pixel electrodes 130 was formed on a 0.5-mm-thick glass substrate 100. On this structure, an $SiO_2$ layer and acrylic resin layer were sequentially formed as a planarizing layer 150. Also, a common electrode 230 was formed on a 0.5-mm-thick glass substrate 200.

Then, each of the planarizing layer 150 and common electrode 230 was spin-coated with Optomer-AL3456 manufactured by JSR, thereby forming a 0.8-μm-thick polyimide resin layer. Note that the relative dielectric constant $\epsilon_{AL}$ of this polyimide resin layer was about 4.0. Then, the surface of the polyimide resin layer was corrugated by using the transfer member shown in FIG. 14.

More specifically, the transfer surface of the transfer member 80 was pressed against the polyimide resin layer, and the polyimide resin layer was pre-cured at 80° C. in this state. Assuming that the volume of the polyimide resin remains unchanged before and after the transfer member 80 is pressed, the minimum value and maximum value of the thickness of alignment layers 140 and 240 are zero and 0.15 μm, respectively, if the thickness of the polyimide resin layer is 0.75 μm. In this example, as described above, the thickness of the polyimide resin layer was set at 0.8 μm which was slightly larger than 0.75 μm, thereby preventing deterioration of the shape accuracy of the corrugated surface caused by the variation in thickness.

The transfer member 80 was then removed from the polyimide resin layer. Subsequently, the polyimide resin layer was completely cured at 180° C.

After that, each polyimide resin layer was rubbed along the arrangement direction of the upslopes. In this manner, alignment layers 140 and 240 were obtained.

Then, a thermosetting adhesive was dispensed on the main surface of the back substrate 10 so as to surround the alignment layer 140. A opening to be used as a liquid crystal injection port was formed in a frame formed by this adhesive layer. After the adhesive was pre-dried, silver paste was dispensed on a transfer pad (not shown).

Granular spacers 8.0 μm in diameter were then dispersed on the alignment layer 240. Although the granular spacers were dispersed as spacers in this example, columnar spacers may be formed by using a photosensitive resin. The columnar spacers can be formed either after or before the corrugated structure is transferred. When the columnar spacers are to be formed before the corrugated structure is transferred, recesses or holes are formed in those positions of the transfer surface of the transfer member 80, which correspond to the columnar spacers.

After that, the back substrate 10 and front substrate 20 were adhered such that the alignment layers 140 and 240 faced each other and their rubbing directions were equal, and the resultant structure was heated. In this way, an empty cell was obtained.

A liquid crystal material was injected into this empty cell by dipping. In this example, E7 (a nematic liquid crystal compound having a maximum relative dielectric constant $\epsilon_{mjr}$ of about 19 and having positive dielectric anisotropy) manufactured by MERCK was used as the liquid crystal material.

Subsequently, an ultraviolet-curing resin was dispensed in the liquid crystal injection port, and irradiated with ultraviolet radiation. In addition, a polarizer 50 was adhered on the outer surface of the back substrate 10, and an optical compensation film 40 and polarizer 50 were sequentially adhered on the outer surface of the front substrate 20.

Note that the optical compensation film 40 used in this example includes an optically anisotropic layer in which a discotic liquid crystal compound forms bend configuration such that the optical axis thereof changes in a plane perpendicular to the X-direction. In the optical compensation film 40, the direction of the maximum principal normal velocity is parallel to the direction of thickness, the direction of the minimum principal normal velocity is parallel to the X-direction, and the direction of the remaining principal normal velocity is parallel to the Y-direction. Also, the optical retardation for light which has a wavelength λ within the green wavelength region and propagates in the direction of thickness of the optical compensation film 40 is 25 nm, and the optical retardation for light having the wavelength λ and propagating in the Y-direction is 5 nm.

The liquid crystal display shown in FIGS. 1 to 3 was completed by combining a liquid crystal display panel 1 thus obtained with a backlight unit (not shown) and the like.

The screen of this liquid crystal display was observed while the backlight was turned on and the liquid crystal display panel 1 was not energized. As a consequence, the screen was not colored, i.e., achromatic color was displayed. This indicates that the liquid crystal material of this liquid crystal display forms not splay configuration but bend configuration even before energizing the display.

Then, while the backlight was kept on, a voltage was applied between the pixel electrodes 130 and common electrode 230, and the absolute value of the applied voltage was gradually increased. Consequently, the brightness monotonically decreased as the absolute value of the applied voltage increased, and became a minimum when the absolute value of the applied voltage was 10 V. During this experiment, no stripe-like modulation in the display brightness was visually observed, so display having a high in-plane brightness uniformity was possible. In addition, the dependence of the colors and brightness on the observation angle was very small regardless of the magnitude of the applied voltage. Note that the contrast was about 500:1 when the applied voltage in the off state was zero and the absolute value of the applied voltage in the on state was 10 V.

EXAMPLE 2

The liquid crystal display shown in FIGS. 1 to 3 was manufactured following the same procedures as explained in Example 1 except that the period P of each of the alignment layers 140 and 240 was set to about 0.25 µm.

In this example, the maximum value $D_{max}$ and minimum value $D_{min}$ of the cell gap were about 8.0 µm and about 7.5 µm, respectively. Also, the maximum value $R_{ON-max}$ of the optical retardation of the optical filter layer 30 in the on state was checked by using an ellipsometer, and found to be about 26 nm. That is, the maximum value $D_{max}$, minimum value $D_{min}$, and maximum value $R_{ON-max}$ satisfy the relationship indicated by inequality (1). In addition, the maximum value $\in_{mjr}$ of the relative dielectric constant of the liquid crystal material was about 19, and the relative dielectric constant $\in_{AL}$ of the alignment layers 140 and 240 was about 4.0. Accordingly, the maximum value $D_{max}$, minimum value $D_{min}$, maximum value $R_{ON-max}$, maximum value $\in_{mjr}$, and relative dielectric constant $\in_{AL}$ satisfy the relationship indicated by inequality (2).

The screen of this liquid crystal display was observed while the backlight was turned on and the liquid crystal display panel 1 was not energized. As a consequence, the screen was not colored, i.e., achromatic color was displayed. This indicates that the liquid crystal material of this liquid crystal display forms not splay configuration but bend configuration even before energizing the display.

Then, while the backlight was kept on, a voltage was applied between the pixel electrodes 130 and common electrode 230, and the absolute value of the applied voltage was gradually increased. Consequently, the brightness monotonically decreased as the absolute value of the applied voltage increased, and became a minimum when the absolute value of the applied voltage was 10 V. During this experiment, no stripe-like modulation in the display brightness was visually observed, so display having a high in-plane brightness uniformity was possible. In addition, the dependence of the colors and brightness on the observation angle was very small regardless of the magnitude of the applied voltage. Note that the contrast was about 400:1 when the applied voltage in the off state was zero and the absolute value of the applied voltage in the on state was 10 V.

EXAMPLE 3

In this example, the OCB-mode liquid crystal display shown in FIGS. 15 to 17 was manufactured by the following method. Note that in this liquid crystal display, the period P and inclination angle α of the alignment layers 140 and 240 were set to about 0.90 µm and 30°, respectively.

First, X electrodes 130 made of ITO were formed on a 0.5-mm-thick glass substrate 100. A planarizing layer 150 made of $SiO_2$ was formed on this structure.

Also, a color filter 220 and Y electrodes 230 made of ITO were formed on a 0.5-mm-thick glass substrate 200. A planarizing layer 250 made of $SiO_2$ was formed on this structure.

Then, 0.6-µm-thick inorganic insulating layers made of $TaO_x$ were formed on the planarizing layers 150 and 250. These inorganic insulating layers were obtained by forming films by RF sputtering using $Ta_2O_5$ as a sputter target, and annealing the films at 200° C. for 1 hour. At the same time these inorganic insulating layers were formed, another inorganic insulating layer was formed on a dielectric measurement region, and the capacitance of the inorganic insulating layers was measured. As a consequence, the relative dielectric constant of these inorganic insulating layers was about 16.

Then, each inorganic insulating layer was spin-coated with OFPR-800 as a resist material manufactured by TOKYO OHKA KOGYO, thereby forming a 0.5-µm-thick resist film. The transfer surface of the transfer member 80 shown in FIG. 14 was pressed against these resist films, and the resist films were pre-cured at 80° C. in this state. The transfer member 80 was then removed from the resist films, and the resist films were completely cured at 140° C.

After that, reactive ion etching using Ar and $O_2$ was performed on these resist films and the underlying inorganic insulating layers. The time during which the inorganic insulating layer is exposed to the reactive gas is longer in a position where the resist film is thin than in a position where the resist film is thick. Accordingly, an uneven structure corresponding to the thickness of the resist film is formed on the surface of the inorganic insulating layer. The reactive ion etching was stopped at the time when the resist films were completely removed. As a result, inorganic insulating layers 140b and 240b each having a corrugated surface in which upslopes having an inclination of about 30° and vertical surfaces were alternately joined and the period of the upslopes was about 0.9 µm were obtained.

Then, the inorganic insulating layers 140b and 240b were spin-coated with Optomer-AL3456 manufactured by JSR, thereby forming 0.05-μm-thick polyimide resin layers. The surface of each polyimide layer was corrugated in conformity with the underlying corrugated surface. Each polyimide resin layer was rubbed along the arrangement direction of the upslopes. In this manner, organic insulating layers 140a and 240a were obtained.

The alignment layers 140 and 240 were mostly made of the inorganic insulating layers 140b and 240b, respectively. Therefore, the relative dielectric constant $\in_{AL}$ of the alignment layers 140 and 240 can be regarded as equal to the relative dielectric constant of the inorganic insulating layers 140b and 240b.

Then, a thermosetting adhesive was dispensed on the main surface of the back substrate 10 so as to surround the alignment layer 140. An opening to be used as a liquid crystal injection port was formed in a frame formed by this adhesive layer.

Granular spacers 8.0 μm in diameter were then dispersed on the alignment layer 240. After that, the back substrate 10 and front substrate 20 were adhered such that the alignment layers 140 and 240 faced each other and their rubbing directions were equal, and the resultant structure was heated. In this way, an empty cell was obtained.

A liquid crystal material was injected into this empty cell by dipping. In this example, E7 (a nematic liquid crystal compound having a maximum relative dielectric constant $\in_{mjr}$ of about 19 and having positive dielectric anisotropy) manufactured by MERCK was used as the liquid crystal material.

Subsequently, an ultraviolet-curing resin was dispensed in the liquid crystal injection port, and irradiated with ultraviolet radiation. In addition, a polarizer 50 was adhered on the outer surface of the back substrate 10, and an optical compensation film 40 and polarizer 50 were sequentially adhered on the outer surface of the front substrate 20.

Note that the optical compensation film 40 used in this example includes an optical anisotropic layer in which a discotic liquid crystal compound forms bend configuration such that the optical axis thereof changes in a plane perpendicular to the Y-direction. In the optical compensation film 40, the direction of the maximum principal normal velocity is parallel to the direction of thickness, the direction of the minimum principal normal velocity is parallel to the Y-direction, and the direction of the remaining principal normal velocity is parallel to the X-direction. Also, the optical retardation for light which has a wavelength λ within the green wavelength region and propagates in the direction of thickness of the optical compensation film 40 is 35 nm, and the optical retardation for light having the wavelength λ and propagating in the X-direction is 5 nm.

The liquid crystal display shown in FIGS. 15 to 17 was completed by combining a liquid crystal display panel 1 thus obtained with a backlight unit (not shown) and the like.

In this example, the maximum value $D_{max}$ and minimum value $D_{min}$ of the cell gap were about 8.0 μm and about 7.0 μm, respectively. Also, the maximum value $R_{ON-max}$ of the optical retardation of the optical filter layer 30 in the on state was checked by using an ellipsometer, and found to be about 41 nm. That is, the maximum value $D_{max}$, minimum value $D_{min}$, and maximum value $R_{ON-max}$ satisfy the relationship indicated by inequality (3). In addition, the maximum value $\in_{mjr}$ of the relative dielectric constant of the liquid crystal material was about 19, and the relative dielectric constant $\in_{AL}$ of the alignment layers 140 and 240 was about 16. Accordingly, the maximum value $D_{max}$, minimum value $D_{min}$, maximum value $R_{ON-max}$, maximum value $\in_{mjr}$, and relative dielectric constant $\in_{AL}$ satisfy the relationship indicated by inequality (4).

The screen of this liquid crystal display was observed while the backlight was turned on and the liquid crystal display panel 1 was not energized. As a consequence, the screen was colored. This indicates that the liquid crystal material of this liquid crystal display forms splay configuration before energizing the display.

Then, while the backlight was kept on, a voltage was applied between the X electrodes 130 and Y electrodes 230, and the absolute value of the applied voltage was gradually increased. Consequently, the screen changed from the colored state to an achromatic state when the absolute value of the applied voltage was raised to 0.5 V. This demonstrates that the liquid crystal material of the liquid crystal display forms bend configuration when a voltage having an absolute value of 0.5 or more is applied between the X electrodes 130 and Y electrodes 230.

When the absolute value of the applied voltage was further increased, the brightness monotonically decreased as the absolute value of the applied voltage increased, and became a minimum when the absolute value of the applied voltage was 10 V. When the absolute value of the applied voltage was relatively small, no modulation in the display brightness was found by observation with the naked eye, although slight brightness unevenness was found by observation using a high-magnification microscope. Also, when the absolute value of the applied voltage was relatively large, no brightness unevenness was found even by observation using a high-magnification microscope. Furthermore, the dependence of the colors and brightness on the observation angle was very small regardless of the magnitude of the applied voltage. Note that the contrast was about 400:1 when the applied voltage in the off state was 0.5 V and the absolute value of the applied voltage in the on state was 10 V.

EXAMPLE 4

The liquid crystal display shown in FIGS. 1 to 3 was manufactured following the same procedures as explained in Example 1 except that the period P and inclination angle α of each of the alignment layers 140 and 240 were set to about 0.04 μm and about 30°, respectively, and the maximum value $D_{max}$ of the cell gap was set to 5 μm.

The screen of this liquid crystal display was observed while the backlight was turned on and the liquid crystal display panel 1 was not energized. As a consequence, the screen was colored. This indicates that the liquid crystal material of this liquid crystal display forms splay configuration before energizing the display.

Then, while the backlight was kept on, a voltage was applied between the pixel electrodes 130 and common electrode 230, and the absolute value of the applied voltage was gradually increased. Consequently, the screen changed from the colored state to an achromatic state when the absolute value of the applied voltage was raised to 0.5 V. This demonstrates that the liquid crystal material of the liquid crystal display forms bend configuration when a voltage having an absolute value of 0.5 V or more is applied between the pixel electrodes 130 and common electrode 230.

When the absolute value of the applied voltage was further increased, the brightness monotonically decreased as the absolute value of the applied voltage increased, and became a minimum when the absolute value of the applied voltage was 10 V. During this experiment, no stripe-like modulation in the display brightness was visually observed, so display having a high in-plane brightness uniformity was possible. Also, the dependence of the colors and brightness on the observation angle was very small regardless of the magnitude of the applied voltage. Note that the contrast was about 500:1 when the applied voltage in the off state was 0.5 V and the absolute value of the applied voltage in the on state was 10 V.

The optical retardation $R_{OFF}$ and optical retardation $R_{ON}$ in the off state and on state, respectively, of the optical filter layer 30 of this liquid crystal display were checked by using an ellipsometer, and found to be about 296 nm and about 27 nm, respectively. Since the inclination angle $\alpha$ was about 30° and the maximum value $D_{max}$ of the cell gap was 5 μm in this liquid crystal display, the value $P_{lim}$ calculated from equation (5) was about 0.08 μm. The period P was about 0.04 μm as described above, so the period P and value $P_{lim}$ satisfy the relationship indicated by inequality (6).

EXAMPLE 5

The liquid crystal display shown in FIGS. 1 to 3 was manufactured following the same procedures as explained in Example 1 except that the period P and inclination angle $\alpha$ of each of the alignment layers 140 and 240 were set to about 0.05 μm and about 30°, respectively, and the maximum value $D_{max}$ of the cell gap was set to 5 μm.

The screen of this liquid crystal display was observed while the backlight was turned on and the liquid crystal display panel 1 was not energized. As a consequence, the screen was colored. This indicates that the liquid crystal material of this liquid crystal display forms splay configuration before energizing the display.

Then, while the backlight was kept on, a voltage was applied between the pixel electrodes 130 and common electrode 230, and the absolute value of the applied voltage was gradually increased. Consequently, the screen changed from the colored state to an achromatic state when the absolute value of the applied voltage was raised to 0.5 V. This demonstrates that the liquid crystal material of the liquid crystal display forms bend configuration when a voltage having an absolute value of 0.5 V or more is applied between the pixel electrodes 130 and common electrode 230.

When the absolute value of the applied voltage was further increased, the brightness monotonically decreased as the absolute value of the applied voltage increased, and became a minimum when the absolute value of the applied voltage was 10 V. During this experiment, no stripe-like modulation in the display brightness was visually observed, so display having a high in-plane brightness uniformity was possible. Also, the dependence of the colors and brightness on the observation angle was very small regardless of the magnitude of the applied voltage. Note that the contrast was about 500:1 when the applied voltage in the off state was 0.5 V and the absolute value of the applied voltage in the on state was 10 V.

The optical retardation $R_{OFF}$ and optical retardation $R_{ON}$ in the off state and on state, respectively, of the optical filter layer 30 of this liquid crystal display were checked by using an ellipsometer, and found to be about 296 nm and about 27 nm, respectively. Since the inclination angle $\alpha$ was about 30° and the maximum value $D_{max}$ of the cell gap was 5 μm in this liquid crystal display, the value $P_{lim}$ calculated from equation (5) was about 0.08 μm. The period P was about 0.05 μm as described above, so the period P and value $P_{lim}$ satisfy the relationship indicated by inequality (7). In addition, the relative dielectric constant $\in_{AL}$ of the alignment layers 140 and 240 was about 4.0, and the maximum value $\in_{mjr}$ of the relative dielectric constant of the liquid crystal material was about 19. Therefore, the relative dielectric constants $\in_{AL}$ and $\in_{mjr}$, period P, and value $P_{lim}$ satisfy the relationship indicated by inequality (8).

COMPARATIVE EXAMPLE

In this comparative example, a liquid crystal display was manufactured following the same procedures as explained in Example 1 except that the period P and inclination angle $\alpha$ of each of the alignment layers 140 and 240 were set to about 80 μm and about 3°, respectively. In this comparative example, the inclination angle $\alpha$ was much smaller than that in Example 1 because if the inclination angle $\alpha$ is 45° as in Example 1, the projections of the alignment layers 140 and 240 collide against each other, so the maximum value $D_{max}$ of the cell gap cannot be set to 8 μm unlike in Example 1.

The screen of this liquid crystal display was observed while the backlight was turned on and the liquid crystal display panel 1 was not energized. As a consequence, the screen was colored. This indicates that the liquid crystal material of this liquid crystal display forms splay configuration before energizing the display.

Then, while the backlight was kept on, a voltage was applied between the pixel electrodes 130 and common electrode 230, and the absolute value of the applied voltage was gradually increased. Consequently, the screen changed from the colored state to an achromatic state a few seconds after a voltage having a relatively large absolute value was applied. This demonstrates that in this liquid crystal display, splay configuration does not easily change to bend configuration. In this state, stripe-like modulation in the display brightness was visually observed, so no good display was possible.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display comprising:
    a back substrate which comprises a first substrate, a first electrode disposed on a main surface of the first substrate, and a first alignment layer covering the first electrode and including a first corrugated surface at a position of the first electrode, wherein the first corrugated surface includes first upslopes and first downslopes steeper than the first upslopes or first vertical surfaces which are alternately joined in an in-plane direction parallel to the main surface of the first substrate, and wherein a period of the first upslope in the in-plane direction is 1 μm or less;
    a front substrate which comprises a second substrate facing the first alignment layer, a second electrode disposed on a main surface of the second substrate facing the first alignment layer, and a second alignment layer covering the second electrode and including a second corrugated surface at a position of the second electrode, wherein the second corrugated surface includes second upslopes and second downslopes steeper than the second upslopes or second vertical surfaces which are alternately joined in the in-plane direction, and wherein a period of the second upslope in the in-plane direction is 1 μm or less; and an optical filter layer interposed between the back and front substrates and containing a liquid crystal material which forms a bend configuration when a voltage is applied between the first and second electrodes.

2. The display according to claim 1, wherein the display is configured to display a first image when a first voltage is applied between the first and second electrodes, and display a second image darker than the first image when a second voltage whose absolute value is larger than an absolute value of the first voltage is applied between the first and second electrodes, and wherein, when the second image is displayed, a difference $\Delta R_{ON}$ between a maximum optical retardation and a minimum optical retardation in a region of the optical filter layer interposed between the first and second electrodes is 5 nm or less.

3. The display according to claim 1, wherein the display is configured to display a first image when a first voltage is applied between the first and second electrodes, and display a second image darker than the first image when a second voltage whose absolute value is larger than an absolute value of the first voltage is applied between the first and second electrodes, and wherein a maximum thickness $D_{max}$ of the optical filter layer at a position interposed between the first and second electrodes, a minimum thickness $D_{min}$ of the optical filter layer at the position interposed between the first and second electrodes, a maximum relative dielectric constant $\epsilon_{mjr}$ of the liquid crystal material, a relative dielectric constant $\epsilon_{AL}$ of the first and second alignment layers, and a maximum optical retardation $R_{ON-max}$ in nanometer in a region of the optical filter layer interposed between the first and second electrodes when the second image is displayed satisfy relationships represented by inequalities (1) and (2) or relationships represented by inequalities (3) and (4)

$$\frac{D_{max} - D_{min}}{D_{max}} < \frac{5}{R_{ON-max}} \quad (1)$$

$$\epsilon_{AL} \geq \frac{0.5}{\left(\frac{5}{R_{ON-max}}\right)} \times \frac{D_{max} - D_{min}}{D_{max}} \times \epsilon_{mjr} \quad (2)$$

$$\frac{D_{max} - D_{min}}{D_{max}} \geq \frac{5}{R_{ON-max}} \quad (3)$$

$$\epsilon_{AL} \geq 0.5 \times \epsilon_{mjr}. \quad (4)$$

4. The display according to claim 1, wherein the display is configured to display a first image when a first voltage is applied between the first and second electrodes, and display a second image darker than the first image when a second voltage whose absolute value is larger than an absolute value of the first voltage is applied between the first and second electrodes, and wherein a difference $\Delta(R_{OFF}-R_{ON})$ between a maximum difference $(R_{OFF}-R_{ON})_{max}$ and a minimum difference $(R_{OFF}-R_{ON})_{min}$ is 5 nm or less in a region of the optical filter layer interposed between the first and second electrodes, the maximum difference $(R_{OFF}-R_{ON})_{max}$ and the minimum difference $(R_{OFF}-R_{ON})_{min}$ being a maximum value and a minimum value of difference between an optical retardation $R_{OFF}$ when the first image is displayed and an optical retardation $R_{ON}$ when the second image is displayed, respectively.

5. The display according to claim 1, wherein the display is configured to display a first image when a first voltage is applied between the first and second electrodes, and display a second image darker than the first image when a second voltage whose absolute value is larger than an absolute value of the first voltage is applied between the first and second electrodes, and wherein the period P of the first or second upslope and a value $P_{lim}$ calculated from a following equation (5) satisfy a relationship represented by following inequality (6), or the period P, the value $P_{lim}$, a maximum relative dielectric constant $\epsilon_{mjr}$ of the liquid crystal material, and a relative dielectric constant $\epsilon_{AL}$ of the first and second alignment layers satisfy relationships represented by following inequalities (7) and (8), $D_{max}$ being a maximum thickness of the optical filter layer at a position interposed between the first and second electrodes, $\alpha$ being a slope angle of the first or second upslopes, and $(R_{OFF}-R_{ON})_{max}$ being a maximum difference between an optical retardation $R_{OFF}$ when the first image is displayed and an optical retardation $R_{ON}$ when the second image is displayed in a region of the optical filter layer interposed between the first and second electrodes $$P_{lim} = \frac{D_{max}}{2 \times \tan\alpha} \times \frac{5}{(R_{OFF} - R_{ON})_{max}} \quad (5)$$

$$P \leq 0.6 \times P_{lim} \quad (6)$$

$$P > 0.6 \times P_{lim} \quad (7)$$

$$\epsilon_{AL} \geq \left[\frac{9}{4} \times \left(\frac{P}{P_{lim}} - 0.6\right) + 0.1\right] \times \epsilon_{mjr}. \quad (8)$$

6. The display according to claim 1, wherein the periods of the first and second upslopes are 0.04 μm or more.

7. The display according to claim 1, wherein the liquid crystal material forms the bend configuration before energizing the display.

8. The display according to claim 1, further comprising a optically compensation film disposed on the back and/or front substrates.

9. The display according to claim 1, wherein each of the first and second alignment layers is subjected to a rubbing process in which the alignment layer is rubbed in the in-plane direction.

10. The display according to claim 1, wherein the back or front substrate further comprises a color filter.

11. The display according to claim 1, wherein the display is an active matrix display.

12. The display according to claim 11, wherein the back substrate is an array substrate and further comprises a color filter between the first substrate and the first electrode.

13. The display according to claim 1, wherein the display is a passive matrix display.

14. The display according to claim 13, wherein the front substrate further comprises a color filter between the second substrate and the second electrode.

15. A liquid crystal display comprising:

a back substrate which comprises a first substrate, a first electrode disposed on a main surface of the first sub strate, and a first alignment layer covering the first electrode and including a first corrugated surface at a position of the first electrode, wherein the first corrugated surface includes first upslopes and first downslopes steeper than the first upslopes or first vertical surfaces which are alternately joined in an in-plane direction parallel to the main surface of the first substrate;

a front substrate which comprises a second substrate facing the first alignment layer, a second electrode disposed on a main surface of the second substrate facing the first alignment layer, and a second alignment layer covering the second electrode and including a second corrugated surface at a position of the second electrode, wherein the second corrugated surface includes second upslopes and second downslopes steeper than the second upslopes or second vertical surfaces which are alternately joined in the in-plane direction; and an optical filter layer interposed between the back and front substrates and containing a liquid crystal material which forms a bend configuration when a voltage is applied between the first and second electrodes.

16. The display according to claim 15, wherein the liquid crystal material forms the bend configuration before energizing the display.

17. The display according to claim 15, wherein each of the first and second alignment layers is subjected to a rubbing process in which the alignment layer is rubbed in the in-plane direction.

18. A liquid crystal display comprising:

a back substrate which comprises a first substrate, a first electrode disposed on a main surface of the first substrate, and a first alignment layer covering the first electrode and including a first corrugated surface at a position of the first electrode, wherein the first corrugated surface includes first upslopes and first downslopes steeper than the first upslopes or first vertical surfaces which are alternately joined;

a front substrate which comprises a second substrate facing the first alignment layer, a second electrode disposed on a main surface of the second substrate facing the first alignment layer, and a second alignment layer covering the second electrode and including a second corrugated surface at a position of the second electrode, wherein the second corrugated surface includes second upslopes and second downslopes steeper than the second upslopes or second vertical surfaces which are alternately joined; and an optical filter layer interposed between the back and front substrates and containing a liquid crystal material which forms a bend configuration when a voltage is applied between the first and second electrodes.

19. The display according to claim 18, wherein the liquid crystal material forms the bend configuration before energizing the display.

20. The display according to claim 18, wherein each of the first and second alignment layers is subjected to a rubbing process.

* * * * *